US010976461B2

(12) United States Patent
Arumugam

(10) Patent No.: US 10,976,461 B2
(45) Date of Patent: Apr. 13, 2021

(54) SUB-SURFACE IMAGING OF DIELECTRIC STRUCTURES AND VOIDS VIA NARROWBAND ELECTROMAGNETIC RESONANCE SCATTERING

(71) Applicant: California Institute of Technology, Pasadena, CA (US)

(72) Inventor: Darmindra D. Arumugam, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 318 days.

(21) Appl. No.: 16/162,197

(22) Filed: Oct. 16, 2018

(65) Prior Publication Data

US 2019/0113647 A1    Apr. 18, 2019

Related U.S. Application Data

(60) Provisional application No. 62/573,441, filed on Oct. 17, 2017, provisional application No. 62/622,699, filed on Jan. 26, 2018.

(51) Int. Cl.
*G01V 3/12* (2006.01)
*G01N 21/47* (2006.01)
(Continued)

(52) U.S. Cl.
CPC ............... *G01V 3/12* (2013.01); *G01N 21/47* (2013.01); *G01N 24/081* (2013.01); *G01S 7/025* (2013.01);
(Continued)

(58) Field of Classification Search
CPC ........ G01V 3/12; G01N 21/47; G01N 24/081; G01N 2021/4792; G01S 7/025; G01S 13/885; G01S 13/9011; G01S 13/90
(Continued)

(56) References Cited

U.S. PATENT DOCUMENTS 3,731,304 A * 5/1973 Caspers ................. G01S 13/66
342/90
4,023,171 A * 5/1977 Stavis ................... G01S 13/605
342/105
(Continued)

FOREIGN PATENT DOCUMENTS

WO   WO-2008006654 A1 * 1/2008 ............. G01S 13/87
WO   WO-2008147574 A2 * 12/2008 ............ G01S 13/933

OTHER PUBLICATIONS

Lundergren et al. ('Volcano Science: Future directions from geodesy, radar imaging and physical models.' National Academies of Sciences, Engineering and Medicine, Washington DC, 2016, pp. 1-6).*

(Continued)

*Primary Examiner* — Vladimir Magloire
*Assistant Examiner* — Nuzhat Pervin
(74) *Attorney, Agent, or Firm* — Steinfl + Bruno, LLP

(57) ABSTRACT

Subsurface imaging with information of shape, volume, and dielectric properties is achieved with low frequencies and a ramp waveform. The low frequencies have a lower attenuation compared to the penetration losses of radar frequencies. The technique operates at wavelengths which are comparable to the object or void being imaged, and can be applied to detect and image underground aquifers, magma chambers, man-made tunnels and other underground structures.

20 Claims, 19 Drawing Sheets

(51) Int. Cl.
  *G01S 13/88* (2006.01)
  *G01S 13/90* (2006.01)
  *G01S 7/02* (2006.01)
  *G01N 24/08* (2006.01)

(52) U.S. Cl.
  CPC ......... *G01S 13/885* (2013.01); *G01S 13/9011* (2013.01); *G01N 2021/4792* (2013.01); *G01S 13/90* (2013.01)

(58) Field of Classification Search
  USPC ........................................................ 342/22
  See application file for complete search history.

(56) References Cited

U.S. PATENT DOCUMENTS

| | | | | |
|---|---|---|---|---|
| 4,100,604 | A * | 7/1978 | Perreault | H04B 3/141 333/18 |
| 4,271,412 | A * | 6/1981 | Glass | G01S 13/70 342/105 |
| 4,381,544 | A * | 4/1983 | Stamm | G01S 13/89 702/2 |
| 4,415,898 | A * | 11/1983 | Gaunaurd | G01S 7/411 342/192 |
| 4,649,388 | A * | 3/1987 | Atlas | G01S 13/951 342/26 D |
| 5,115,243 | A * | 5/1992 | Perry | G01S 7/282 342/137 |
| 5,357,253 | A * | 10/1994 | Van Etten | G01S 7/4021 324/337 |
| 5,420,589 | A * | 5/1995 | Wells | G01S 13/0209 342/22 |
| 5,497,157 | A * | 3/1996 | Gruener | G01S 13/343 342/29 |
| 5,592,170 | A * | 1/1997 | Price | F41H 11/16 342/22 |
| 5,673,050 | A * | 9/1997 | Moussally | G01S 13/0209 342/22 |
| 5,760,740 | A * | 6/1998 | Blodgett | H04B 1/126 342/362 |
| 6,216,540 | B1 * | 4/2001 | Nelson | A61B 5/0091 73/633 |
| 6,377,201 | B1 * | 4/2002 | Chu | G01S 13/0209 342/118 |
| 6,591,171 | B1 * | 7/2003 | Ammar | G01S 13/4418 701/16 |
| 6,975,942 | B2 * | 12/2005 | Young | G01V 1/00 367/37 |
| 7,340,265 | B2 * | 3/2008 | Husted | H04B 1/1027 455/114.2 |
| 8,126,677 | B2 * | 2/2012 | De Groot | G01B 11/2441 702/166 |
| 8,355,429 | B2 * | 1/2013 | Adams | H03M 1/0836 375/226 |
| 8,400,349 | B1 * | 3/2013 | Dubbert | G01S 7/32 342/113 |
| 8,421,464 | B2 * | 4/2013 | Bausov | G01V 8/005 324/329 |
| 8,570,207 | B1 * | 10/2013 | Dawood | G01S 13/89 342/22 |
| 9,075,142 | B2 * | 7/2015 | Takemoto | G01S 13/589 |
| 10,185,048 | B2 * | 1/2019 | Park | G01V 3/16 |
| 10,187,741 | B2 * | 1/2019 | Franck | H04S 3/004 |
| 10,263,329 | B1 * | 4/2019 | Powers | H01Q 3/26 |
| 10,355,446 | B1 * | 7/2019 | Ensher | H01S 5/06804 |
| 10,404,261 | B1 * | 9/2019 | Josefsberg | H03L 7/091 |
| 10,598,764 | B2 * | 3/2020 | Josefsberg | H03L 7/091 |
| 2002/0060639 | A1 * | 5/2002 | Harman | G01S 13/62 342/28 |
| 2003/0019291 | A1 * | 1/2003 | Pchelnikov | G01F 23/284 73/290 V |
| 2003/0072334 | A1 * | 4/2003 | Tanimoto | H01S 5/141 372/20 |
| 2003/0160968 | A1 * | 8/2003 | Deck | G01B 9/02057 356/515 |
| 2004/0225444 | A1 * | 11/2004 | Young | G01V 11/002 702/14 |
| 2005/0073310 | A1 * | 4/2005 | Weatherall | G01V 3/12 324/318 |
| 2007/0047678 | A1 * | 3/2007 | Sibecas | H04L 5/023 375/343 |
| 2007/0091317 | A1 * | 4/2007 | Freischlad | G01B 11/0675 356/511 |
| 2008/0091380 | A1 * | 4/2008 | Nagasaku | H01Q 15/08 702/142 |
| 2008/0246647 | A1 * | 10/2008 | Hellsten | G01S 13/904 342/22 |
| 2009/0033538 | A1 * | 2/2009 | Winkler | G01S 7/4008 342/21 |
| 2009/0182528 | A1 * | 7/2009 | De Groot | G01B 11/0675 702/167 |
| 2009/0278725 | A1 * | 11/2009 | Greegor | G01V 3/12 342/22 |
| 2010/0150209 | A1 * | 6/2010 | Gonzalez | G01S 11/02 375/139 |
| 2010/0214152 | A1 * | 8/2010 | Huang | G01S 7/414 342/29 |
| 2011/0304337 | A1 * | 12/2011 | Bausov | G01V 8/005 324/329 |
| 2012/0001628 | A1 * | 1/2012 | Weatherall | G01V 3/12 324/300 |
| 2012/0262190 | A1 * | 10/2012 | Kondo | G01N 21/3581 324/639 |
| 2013/0044771 | A1 * | 2/2013 | Minneman | H01S 5/0652 372/20 |
| 2013/0063299 | A1 * | 3/2013 | Proudkii | G01V 3/12 342/188 |
| 2013/0194130 | A1 * | 8/2013 | Abatzoglou | G01S 7/415 342/159 |
| 2013/0344445 | A1 * | 12/2013 | Clube | G03F 7/70408 430/322 |
| 2014/0252250 | A1 * | 9/2014 | Botto | G01R 33/0041 250/564 |
| 2015/0028890 | A1 * | 1/2015 | Troxler | G01N 33/38 324/642 |
| 2015/0153470 | A1 * | 6/2015 | Stove | G01S 7/411 702/6 |
| 2015/0212653 | A1 * | 7/2015 | Cable | G06F 3/0426 345/175 |
| 2015/0226848 | A1 * | 8/2015 | Park | G01S 7/354 342/70 |
| 2015/0331097 | A1 * | 11/2015 | Hellsten | G01S 13/885 342/25 F |
| 2015/0379356 | A1 * | 12/2015 | Nikolova | G01V 3/12 342/90 |
| 2016/0041257 | A1 * | 2/2016 | Holbourn | G01S 7/2925 342/379 |
| 2016/0084715 | A1 * | 3/2016 | Hori | G01J 9/0246 356/479 |
| 2016/0154104 | A1 * | 6/2016 | Schumann | G01S 15/34 367/91 |
| 2016/0178729 | A1 * | 6/2016 | Dolgin | G01S 13/48 342/157 |
| 2018/0143314 | A1 * | 5/2018 | Pelletier | H01Q 3/04 |
| 2018/0232913 | A1 * | 8/2018 | Seevinck | G01R 33/5608 |
| 2018/0256507 | A1 * | 9/2018 | Helliwell | A61K 9/5026 |
| 2018/0356507 | A1 * | 12/2018 | Ichinose | G01S 13/933 |
| 2019/0056488 | A1 * | 2/2019 | Vacanti | G01S 7/003 |
| 2019/0064338 | A1 * | 2/2019 | Holt | G01S 13/426 |
| 2020/0081319 | A1 * | 3/2020 | Totsuka | G02F 1/3534 |
| 2020/0200893 | A1 * | 6/2020 | Mazeau | G06F 7/556 |

OTHER PUBLICATIONS

Chauveau, J. et al., "Low Frequency Imaging of Separated Objects using the Ramp Response Technique", Antennas and Propagation Society International Symposium (APSURSI), IEEE, (Jul. 2010). 4 pages.

(56) References Cited

OTHER PUBLICATIONS

Chauveau, J. et al., "Low Frequency Radar Targets 3-Dimensional Imaging Using Ramp Response Signatures", International Radar Conference "Surveillance for a Safer World", RADAR 2009, IEEE, (Jan. 2009). 6 pages.
Chen, C-C. et al., "Radar Scattering and Target imaging Obtained using Ramp-Response Techniques", IEEE Antennas and Propagation Magazine, vol. 49, No. 3, pp. 13-27, (Jun. 2007).
Daniels, D.J. et al., "Introduction to Subsurface Radar", Radar and Signal Processing, IEEE Proceedings F-Communications, Radar, and Signal Processing, vol. 135, No. 4, pp. 278-320, (Aug. 1988).
Howard, A.Q. "The Electromagnetic Fields of a Subterranean Cylindrical Inhomogeneity Excited by a Line Source," Geophys. vol. 37, No. 6, pp. 975-984, (Dec. 1972).
Kleinman, R.E. "The Rayleigh Regio", Proceedings of the IEEE, 53(8), pp. 848-856, (Aug. 1965).
Lawrence, D.E. et al., "Electromagnetic Scattering from a Dielectric Cylinder Buried Beneath a Slightly Rough Surface," IEEE Transactions . . . , vol. 50, No. 10, pp. 1368-1376, (Oct. 2002).
Lundgren, P. et al. "Volcano science: Future directions from geodesy, radar imaging and physical models." *National Academies of Sciences, Engineering, and Medicine*, (Jan. 2016), 6 pages.
Mahmoud, S.F. et al., "Electromagnetic scattering from a buried cylindrical inhomogeneity inside a lossy earth," Radio Sci., vol. 16. No. 6, pp. 1285-1298, (Nov./Dec. 1981).
Mensa, D.L. et al., "Coherent Doppler tomography for microwave imaging" Proc IEEE vol. 71, No. 2, pp. 254-261, (Feb. 1983).
Ogunade, S.O., "Electromagnetic response of an embedded cylinder for line current excitation," Geophys., vol. 46. No. 1, pp. 45-52, (Jan. 1981).
Steinberg, B.K. et al., "Electrical parameters of soils in the frequency range from 1kHz to 1GHz, using lumped-circuit methods" Radio Sci, vol. 36, No. 4, pp. 709-719, (Jul./Aug. 2009).
Young, J.D. "Radar Imaging from Ramp Response Signatures", IEEE Transactions on Antennas and Propagation. vol. 24. Issue 3, pp. 276-282, (May 1976).

Bohren, C. et al., "Absorption and Scattering of Light by Small Particles", New York, Wiley, (1983). 533 pages. (4 parts).
Doocy, S. et al., "The Human Impact of Earthquakes: A Historical Review of Events 1980-2009 and Systematic Literature Review", PLOS Current Disasters, Edition 1, (Apr. 16, 2013). 39 pages.
Gleeson, T. et al., "The Global Volume and Distribution of Modern Groundwater", Nature Geoscience, vol. 9, pp. 161-167, (2016). 10 pages.
Grimm, R.E. et al., "Absorption and Scattering in Ground-Penetrating Radar: Analysis of the Bishop Tuff", Journal of Geophysical Research, vol. 111, E06S02, (2006). 16 pages.
International Search Report for International Application No. PCT/US2018/056117 filed Oct. 16, 2018 on behalf of California Institute of Technology, dated Feb. 8, 2019. 4 pages.
Jackson, J.D. "Classical Electrodynamics", John Wiley & Sons, (1962). 656 pages. (3 parts).
Malik, N. et al., "Measurements of Earth Resistivity in Different Parts of Saudi Arabia for Grounding Installations", Proceedings of the 7th Saudi Engineering Conference, KSU, Riyadh, (2007). 10 pages.
Picardi, G. et al., "Radar Soundings of the Subsurface of Mars", Science, vol. 310, pp. 1925-1928, (Dec. 23, 2005). 6 pages.
Pieri, D. In Situ Observations and Sampling of Volcanic Emissions with NASA and UCR Unmanned Aircraft, including a Case Study at Turrialba Volcano, Costa Rica, Geological Society, London, Special Publications, 380, pp. 321-352, (Sep. 25, 2013). 33 pages.
Segall, P., "Volcano Deformation and Eruption Forecasting", Geological Society, London, Special Publications, 380(1), pp. 85-106, (2013). 23 pages.
Small, I. et al., "Acting on an Environmental Health Disaster: The Case of the Aral Sea", Environmental Health Perspectives, 109(6), pp. 547-549, (2001).
Written Opinion for International Application No. PCT/US2018/056117 filed Oct. 16, 2018 on behalf of California Institute of Technology, dated Feb. 8, 2019. 9 pages.

* cited by examiner

SUB-SURFACE IMAGING OF DIELECTRIC STRUCTURES AND VOIDS VIA NARROWBAND ELECTROMAGNETIC RESONANCE SCATTERING

CROSS REFERENCE TO RELATED APPLICATIONS

The present application claims priority to U.S. Provisional Patent Application No. 62/573,441, filed on Oct. 17, 2017, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to imaging. More particularly, it relates to the detection of deeply embedded dielectric structures and voids via electromagnetic resonance scattering.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
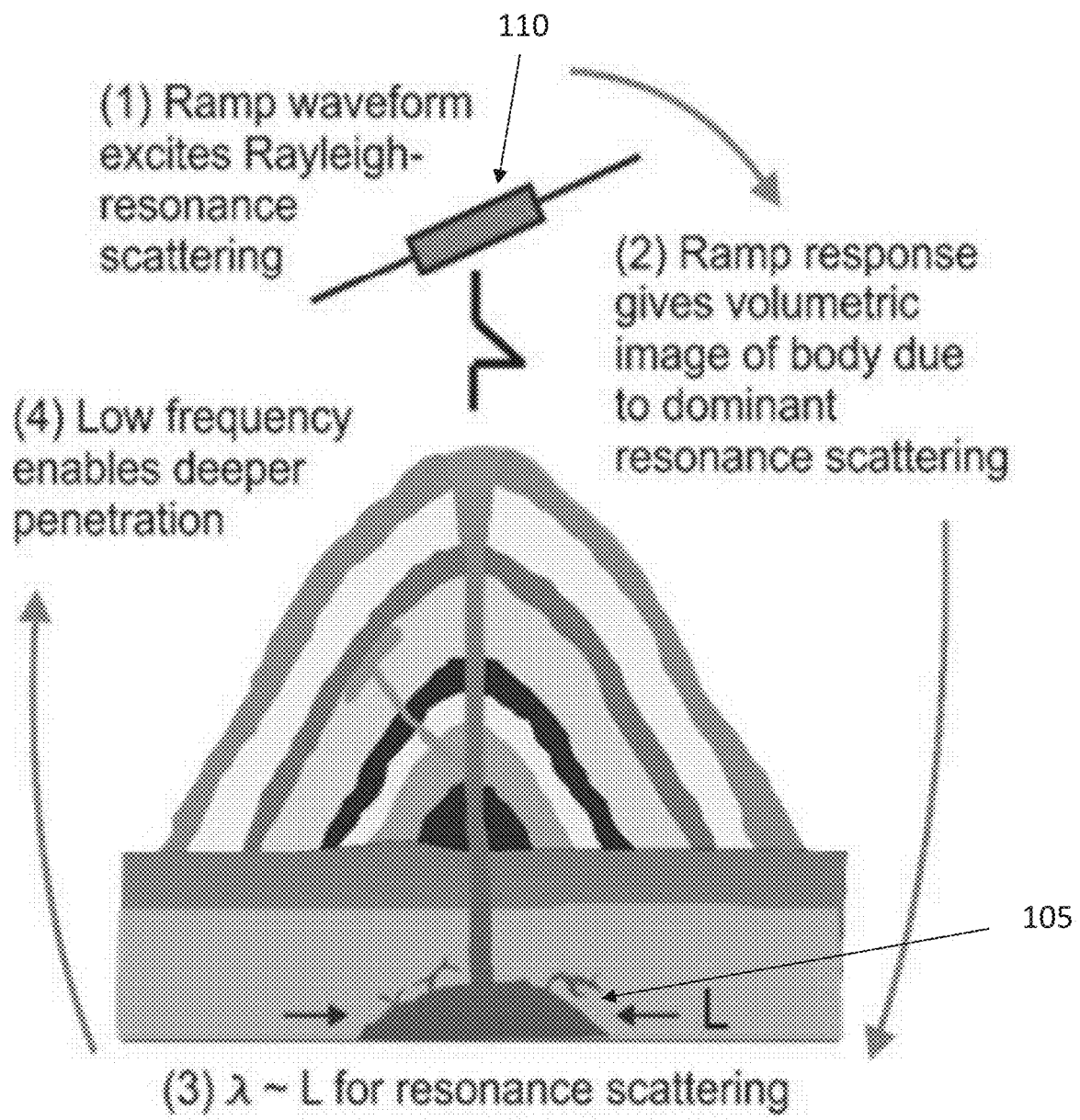
FIGS. 1-2 illustrate an exemplary application of the methods of the present disclosure.

In a first aspect of the disclosure, a method is described, the method comprising: generating electromagnetic waves in a wavelength range, the electromagnetic waves having a plurality of orthogonal linear polarizations; transmitting, by a transmitter, the electromagnetic waves to an object to be imaged; detecting, by a receiver and at each polarization of the plurality of orthogonal linear polarizations, electromagnetic waves scattered by the object, wherein: the object is located below ground, the transmitter and receiver are located above ground, and the wavelength range comprises wavelengths between 0.2 and 3 times a perimeter or lateral dimension of the object.

DETAILED DESCRIPTION

The present disclosure describes sub-surface imaging through the use of electromagnetic resonance. In particular, the present disclosure describes the detection of deeply embedded dielectric structures and voids via electromagnetic resonance scattering. The traditional approach to directly observe or image structures or voids beneath the ground, from an airborne or non-grounded sensor, is to use radar-sounding technology. Non-grounded sensors are sensors which are not connected to ground. Signal processing of radar sounding with synthetic aperture radar (SAR) is routinely used to enable imaging of shallow interior layering. For example, it can be used to image ice, dust, or sediment layering, as described in Ref [1]. The technique of radar sounding is also routinely applied to ground-penetrating radars (GPRs) to permit shallow detection of pipes, wires, and other metals, infrastructure, and construction materials, as described in Ref [2]. Radar sounding generally relies on the transmission and reflection of electromagnetic pulses. Based on these electromagnetic pulses, an approximate one-dimensional range response is used together with a synthetically generated aperture, to generate an approximate dielectric image or map of the shallow interiors. Sounding technology uses a high frequency (HF) pulse, general between 10 and 100 MHz, to penetrate the ground. The HF pulse is necessary to provide a sufficient radar bandwidth, typically a minimum of 3-5 MHz, to enable an effective range resolution. Due to the use of high frequencies, sounding radars cannot penetrate deeply into lossy dielectric or conducting grounds, as high frequencies are substantially attenuated in the medium. In particular, the person of ordinary skill in the art will understand that electromagnetic waves at high frequencies are attenuated at an exponential rate as a function of depth. The rapid attenuation limits the ability of high frequencies to image deeply embedded structures and bodies, such as magma within volcanic systems, and deep aquifers. Similarly, the attenuation limits imaging of any void or structure at depths below a few tens of meters, in any kind of lossy ground, including man-made tunnels at depths greater than 10-30 meters.

In commercial, civil, and defense applications of sounding radars, the radio frequencies (RFs) of sounding radars can be modified to address different applications, however the fundamental problem remains: these techniques do not penetrate deeply into lossy dielectrics, due to the rapid attenuation of electromagnetic waves propagating into the ground.

The present disclosure describes the basis of resonance scattering theory and techniques. In particular, the present disclosure describes the use of scattering electromagnetic waves in the extended resonance regime, which is different from the high frequency pulses used in sounding radars. The high frequency pulses scatter in the geometrical optics radar regime. Both techniques can be used to image subsurface, however sounding radars can only image at shallow depths, due to attenuation losses. In comparison, the resonance scattering technique of the present disclosure uses very low frequencies, to obtain resonance scattering and permit significantly deeper penetrations due to low attenuation losses. The technique of the present disclosure therefore permits detection of objects at large depths beneath the ground. As known to the person of ordinary skill in the art, geometrical optics describes the propagation of electromagnetic waves in terms of rays, which propagate in straight or curved lines depending on the homogeneity of the medium. Geometrical optics does not account for optical effects such as diffraction and interference.

There are three distinct regimes in electromagnetic wave scattering. The first regime is the Rayleigh regime, where obstacles that scatter energy (referred to as scatterers) are very small relative to the applied wavelength. In this regime, the scatterers can be considered point-like targets, and information about the shape of the object being imaged is lost to the observer. The second regime is the resonance regime, which encompasses scatterers that are comparable in size to the wavelength. In this regime the shape and dielectric information is encoded in the measured scattering. The third regime is the wave scattering regime, which is the normal scattering regime in which radars and sub-surface radars operate. In the wave scattering regime the scatterers are large or very large in dimensions, compared to the wavelength. The shape information is lost in this regime due to the complexity in the scattering functions. The extended resonance regime is described as the electromagnetic scattering regime that encompasses the near-to-far resonance scattering regime of the body to be imaged. This resonance scattering regime includes near-Rayleigh regime scattering physics, and the entire resonance regime scattering, which includes about 1-2 wavelength perimeters or lateral dimensions. Wavelength perimeters are defined as the number of wavelengths that can fit on the perimeter of the scatterer. Wavelength lateral dimensions are defined as the number of wavelengths that can fit on any one lateral dimension of the scatterer. In essence, the approach of the present disclosure is to use very low frequencies that correspond to wavelengths which are comparable to the shape and size of the scatterer. In particular, in some embodiments the present disclosure describes very low frequencies as those that correspond to about 0.2 to 3 wavelength perimeters or lateral dimensions of the object to be imaged, with the strongest response typically found at about one wavelength perimeters or lateral dimension. For large structures, this condition corresponds to low frequencies, which will have low attenuation losses, and thus will penetrate deeper into lossy media which normally form a planetary crust, soil or ground. The resonance detection technique requires some knowledge of the structure to be detected, so that appropriate wavelengths can be selected. Proper selection of wavelengths, for the given scatterer, will result in resonance scattering which contains information about shape, structure, and dielectric properties.

Measurements taken in the electromagnetic resonance region generate information on the scattering body with reference to its shape or surface area, as well as its dielectric characteristics. Strongly conducting bodies are surface scatterers, as the electromagnetic waves do not penetrate the conducting body. As a consequence, the resonance scattering of such conducting bodies is strongly dependent on their shape. The Rayleigh region is known to contain information about the volume of the scattering body, whereas the resonance region is known to contain information about the shape or area of the scattering body. The Rayleigh regime is described as the regime where scatterers are very small relative to the wavelength. In this regime, the scatterers are point targets and information about the shape of the object is lost to the observer or measurement.

Imaging by Rayleigh resonance (RR) scattering has been formulated in the past for free space applications of conducting targets in air, using a time domain ramp waveform instead of a pulse waveform as used in sounders and traditional radars, as described in Ref [3]. The time domain ramp waveform is a simple linear ramp amplitude function in time, as opposed to a pulse shaped waveform in time. The shape of the ramp has benefits in exciting resonance scattering once the response is observed in the frequency domain. This is due to the transformation of a ramp function from the time domain to the frequency domain as discussed in the following. The purpose of the ramp waveform is to emphasize the low frequency scattering by the body, thus emphasizing its Rayleigh resonance scattering.

For structures and targets located in free space or air, it is known to the person of ordinary skill in the art that the area of the body, as a function of depth, can be found directly from the ramp response of a target body in free space, $A(r') \cong bR(r')$, where $A(r')$ is the area function of the body in the r' look direction, $R(r')$ is the ramp response of the body in the r' direction, and $b=1/\pi c^2$ is a constant. The volumetric image of the body can be generated using three or more unique images by the resonance radar, with each image obtained via the ramp response. The technique relies on dominant scattering information in the resonance region, where the size of the body, s, is comparable to the wavelength of the electromagnetic wave, $s \sim \lambda$.

The extended resonance volume imaging through use of the ramp function has also been used in acoustic radars for imaging underwater targets, as well as small conducting targets such as land mines or conducting bodies such as unexploded ordnance (UXO). Additionally, new algorithms have been recently proposed to enable 3D volume imaging in free space using as few as three looks with resonance imaging. The technique has also been shown to operate well with multiple, separated bodies in free space within the imaging scene.

A simplified description of the shape dependence within the Rayleigh Resonance regime is given through the ramp response of the target. The physical optics approximation (PO) can be applied in this case. As known to the person of ordinary skill in the art, the physical optics approximation consists of using ray optics to estimate the field on a surface, followed by the integration of that field over the surface to calculate the transmitted or scattered field. The scattered electric field of an x-polarized incident plane-wave, propagating along the z-axis and reflected by a conducting body for simplicity, can be simplified under the physical optics approximation to give:

$$E_s^x = -\frac{j\omega}{2\pi r}e^{j(\omega t-kz)}\int_S n\cdot(H_i\times x)e^{-jkz}dS = \frac{j\omega}{2\pi cr}e^{j(\omega t-kz)}\int_S z\cdot nE_0 e^{-2jkz}dS,$$

where $\omega$ is the angular frequency, r is the range, k is the propagation constant, S denotes the surface of the body, n is the surface normal unit vector on S, $E_s$ is the scattered field, $E_0$ is the amplitude of the incident field, and $H_i=y(1/\mu c)E_0 e^{-jkz}$ is the definition of the magnetic field in terms of the electric field intensity. For finite bodies where $r \gg L$, with L the size of the body, $r^{-1}$ is implied as not varying significantly over the surface. A normalized back-scatter phasor domain transfer function, F, can be defined as:

$$F = \frac{E_{sN}}{E_i} = \frac{j\omega}{\pi c^2}\int_S e^{-2jkz}z\cdot ndS \rightarrow F(s) = -\frac{s}{\pi c^2}\int_{t'=0}^{t'=\infty}e^{-st'}\left(\frac{dA_z}{dt'}\right)dt',$$

where $E_{sN}$ is the field quantity normalized by c/2r. The Laplace transfer function on the right side of the above equation is obtained by defining ·n dS=z·dS=−dA$_z$, where A$_z$ is the cross-sectional area function of the body at z, k=ω/c, t'=2z/c, and by the substitution s↔jω. By using the known definition of the Laplace transform, and s G(s)↔g'(t')+g(0), it is possible to find the impulse response of the scattered fields from the body. The ramp response is found through integration of the impulse response for finite integrals over t':

$$F_I(t') = -\frac{1}{\pi c^2}\frac{d^2 A_z(t')}{dt'^2} \rightarrow F_R(t') = -\frac{1}{\pi c^2} A_z(t')$$

The impulse response is sensitive to the second derivative change in the area function (i.e., abrupt changes). Therefore, pulse radars generally sense the interface between air and the body, and must image via various diverse looks of the body. For example, inverse scattering methods may be used, including the Born inverse approximation, diffraction tomography, and Bojarski methods. Conversely, the Rayleigh resonance approach, using the ramp response given by (jω)$^{-2}$ of the impulse response, has several advantages as described in the following. The Rayleigh resonance approach: is sensitive to the area function and images the shape directly; uses lower frequencies corresponding to the resonance regime; is considerably "smoother" than the impulse response; requires fewer moments for estimation; and is effective with extremely sparse, narrow band, frequency domain measurements. The technique based on Rayleigh resonance images the body with only a single look, unlike pulse-based radars, and obtains a higher image resolution by synthetically combining various looks of the body.

As known to the person of ordinary skill in the art, dielectric bodies that are weakly conducting or low-loss have a volume scattering behavior, which is strongly dependent on the tight coupling of shape, permittivity, and conductivity of the body. The determination of the position of the body below ground is governed by the ranging capabilities of a radar system. However, the resolution of radar inversion/imaging is governed by bandwidth and aperture, as well as the shape and dielectric permittivity and conductivity of the body. The additional, strong dependence on shape and dielectric permittivity and conductivity of the body is due, in the electromagnetic resonance regime, to the strong dependence of the scattered fields on the incident and reflection angles of the electromagnetic waves.

While enabling detection of shape, location, dielectric permittivity, and dielectric conductivity is an improvement over existing sub-surface sounding radars technologies, a key additional value of the radar technique based on electromagnetic resonance is that the resonance behavior is strongly focused in regions where the electromagnetic wavelengths have comparable sizes to the enclosing size of the body under investigation. This fact implies that for large bodies or targets, such as groundwater, aquifers or magma chambers, long wavelength resonance scattering can be used.

For example, an aquifer located 200-500 m below ground would have electromagnetic resonances in the wavelength regime between 1.5 and 6 km (for simplicity, this calculation assumes a spherical body). The corresponding frequency of electromagnetic resonances would be between 150 and 500 kHz. Attenuation of a radar signal is a function of radar frequency, therefore at the low radio frequencies needed (150-500 kHz), a substantial improvement can be expected in sub-surface penetration depths. The soil may contain overburdens, which are made of rock or soil overlying a mineral deposit or other soil feature. Most conducting dielectric overburdens will behave as good conductors at low frequencies, as scattering losses are reduced at lower frequencies. As a consequence, at these low frequencies, (e.g. 150-500 kHz), a significant portion of radar losses are dependent on attenuation only, while the scattering losses can be considered negligible.

FIG. 1 illustrates an exemplary application of the methods of the present disclosure. A volcano is illustrated, including a magma chamber (105). FIG. 1 illustrates a flowchart as the ramp waveform (1) excites Rayleigh resonance through an airborne radar platform (110), by exciting the low frequency spectral content through resonance scattering. The spectral content for the resonance scattering is primarily focused on wavelengths that are comparable to the size of the magma chamber (105), or embedded body, to be imaged. These wavelengths correspond to a frequency approximately below 1 MHz, a low frequency that can penetrate deep into the ground. FIG. 1 illustrates an exemplary magma chamber of width L. The ramp response gives a volumetric image of the body due to the dominant resonance scattering (2). The wavelength is comparable to the size of the magma chamber (3). The low frequencies enable deeper penetration into the ground (4).

The ramp response of the body to be imaged naturally gives the area function of the system as a function of the resonance radar range. In essence, the shape of the body is directly coupled to the resonant electromagnetic coupling and scattering. However, in addition to this unique property, the principle of resonant scattering requires excitation and detection of radio scattering at wavelengths that are comparable to the size of the body to be detected or sensed. For large bodies, this implies long wavelengths or very low frequencies that can, in principle, penetrate deep into the subsurface of media such as soil (e.g. in FIG. 1).

Figure 2:
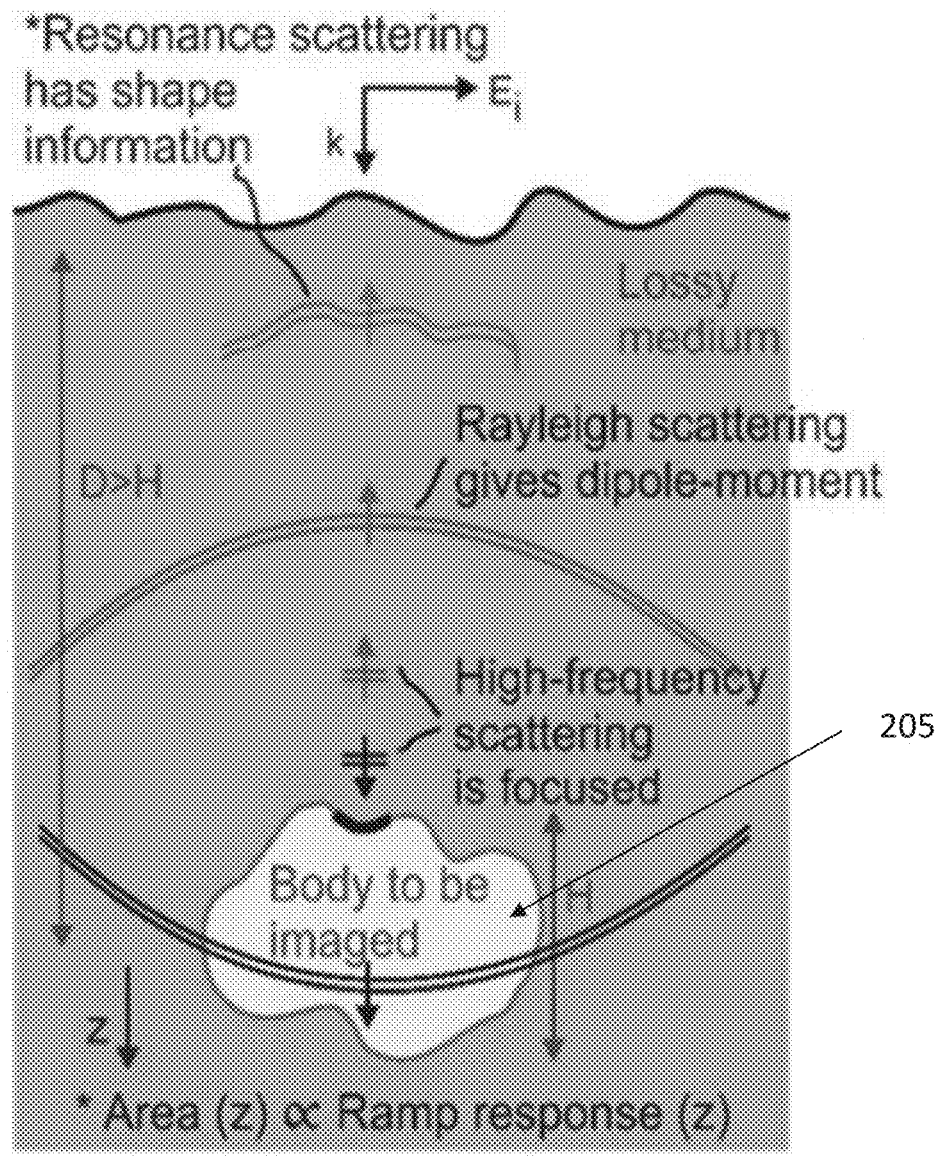

FIG. 2 shows a cut-plane view of the process of electromagnetic scattering, where three modes of scattering are shown due to induced, linearly polarized fields propagating in the z axis directed towards the sub-surface. The three modes includes the Rayleigh scattering mode (205) where the wavelength is significantly longer than the size of the object to be detected, the resonance scattering mode where wavelengths are comparable to the size of the object to be detected, and high frequency or geometrical/optical/radar regime scattering where scattering is focused and wavelengths are very small relative to the size of the object. In FIG. 2, H is the size of the body to be imaged, and D is the depth of the body (205) from the surface. Only the resonance scattering contains the shape information of the body to be imaged or detected.

Figure 3:
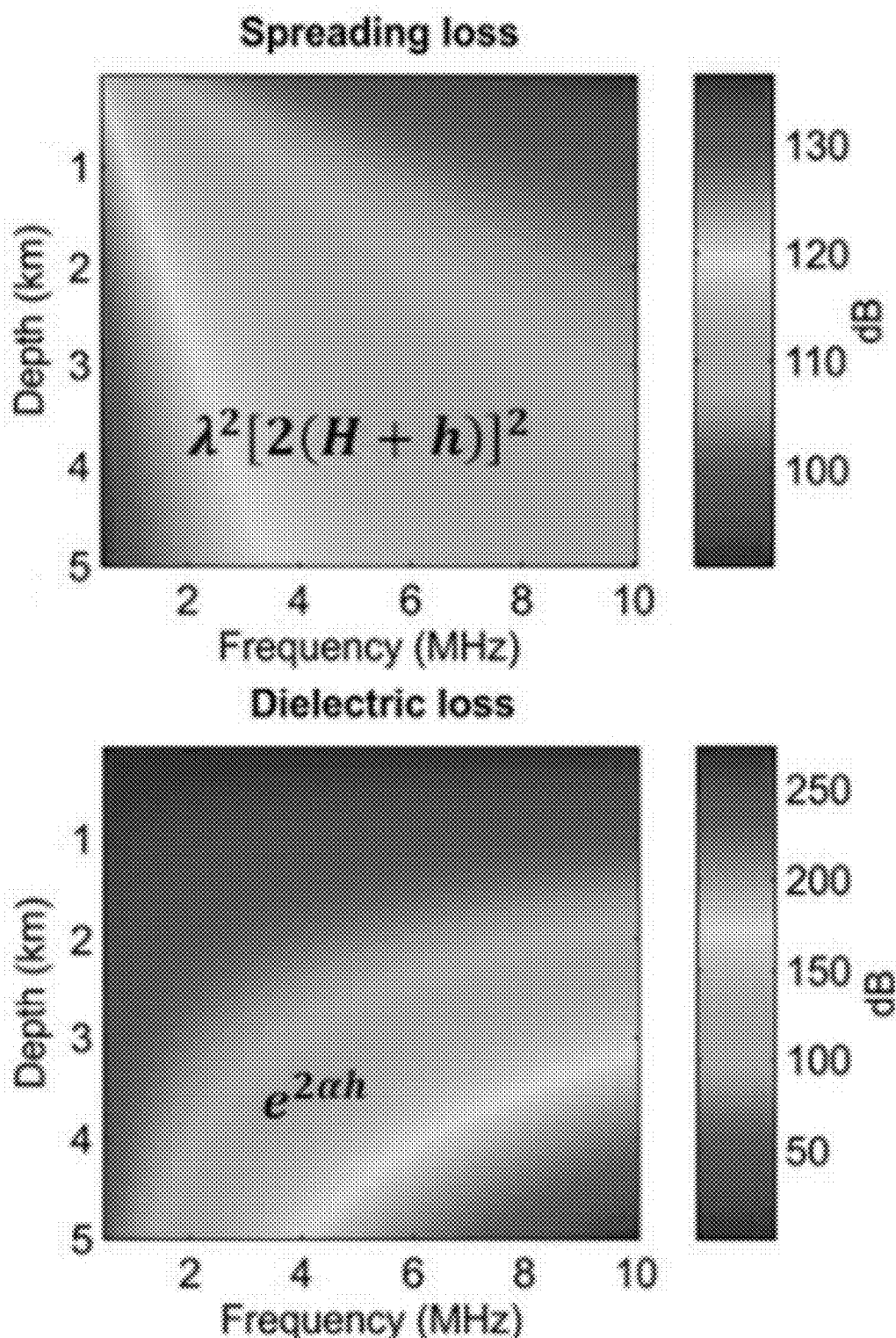
FIG. 3 illustrates spreading and dielectric loss of a propagating wave as a function of frequency and depth into the sub-surface of a lossy-dielectric.

FIG. 3 illustrates how the spreading loss increases proportionally to the square of the wavelength, λ, or depth. However, the dielectric loss, defined by the attenuation constant, α, reduces exponentially, providing greater penetration depths for lower frequencies. In the example of FIG. 3, H=1 km, h=0.1-5 km, and the bulk conductivity is given by $1e^{-6}$ S/m.

In some embodiments, a simplified rule which can be applied to evaluate the application, is to assume the worst case high conductivity limit for the overburden, when the inverse of the electromagnetic skin depth can be considered as the attenuation of the radar signal propagation. Exemplary electrical resistivity measurements in Saudi Arabian deserts show that loose sand can have a resistivity of the order of about 10 kOhm-meters in the Southern region, and up to about 600 kOhm-meters in the Central region, which relate to conductivities of the order of 1 mS/m to 1.6 µS/m. For this desert sand, the calculated radar loss at frequencies of the order of 150 kHz is about 0.06-0.0086 dB/m for one-way radar loss, and about 0.12-0.0172 dB/m for two-way loss, suggesting that a 100 dB signal-to-noise ratio (SNR) radar can penetrate as deep as 800 m-5.8 km.

The actual penetration depths in these environments may indeed be lower than the above analysis suggests, due to residual scattering losses, higher attenuations, spreading losses, and weak contrasts at the interfaces with groundwater. It is nevertheless valuable to note that the practical limitations from ground-based resistivity measurements indicate that resonance scattering can be achieved to considerable underground depths. It should also be noted, as evident from the simplified calculations of the present disclosure, that large bodies of groundwater provide lower electromagnetic resonance frequencies, which imply deeper penetration.

The benefits of using resonance scattering to image or detect dielectric structures or voids in deep subsurface environments are described in the following. Resonance scattering gives information about shape and volume of the structure or voids which are being imaged below ground level. Resonance scattering requires wavelengths that are comparable to the size of the dielectric body or void. Therefore, for large structures such as tunnels, aquifers, or magma, etc., long wavelengths can be utilized. The long wavelengths, corresponding to low frequencies, can penetrate deeper than traditional ground-penetrating radars or sounding radars, but require different techniques for image formulation than those used in sounding radars. Resonance scattering can have resolution similar to that of radar. Resonance scattering can be measured or sensed by a receiver or transmitter-receiver pair that operates from a low altitude airborne platform, unlike active seismic systems that must be connected to the ground.

Figure 4:
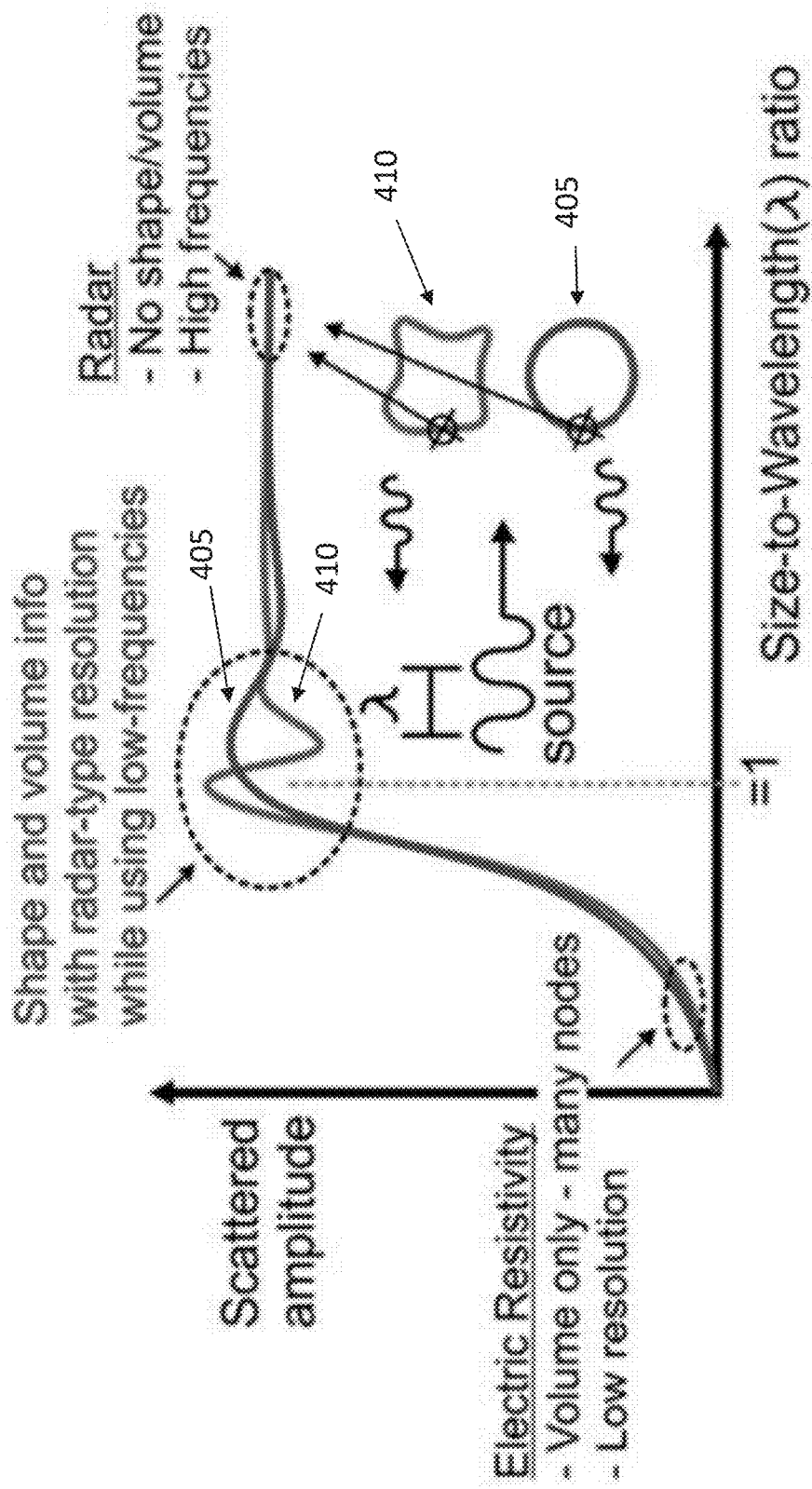
FIGS. 4-5 illustrate the scattering physics phenomenology at different size to wavelength ratios, and bandwidth considerations for resonance scattering compared to typical radar bandwidths.
Figure 5:
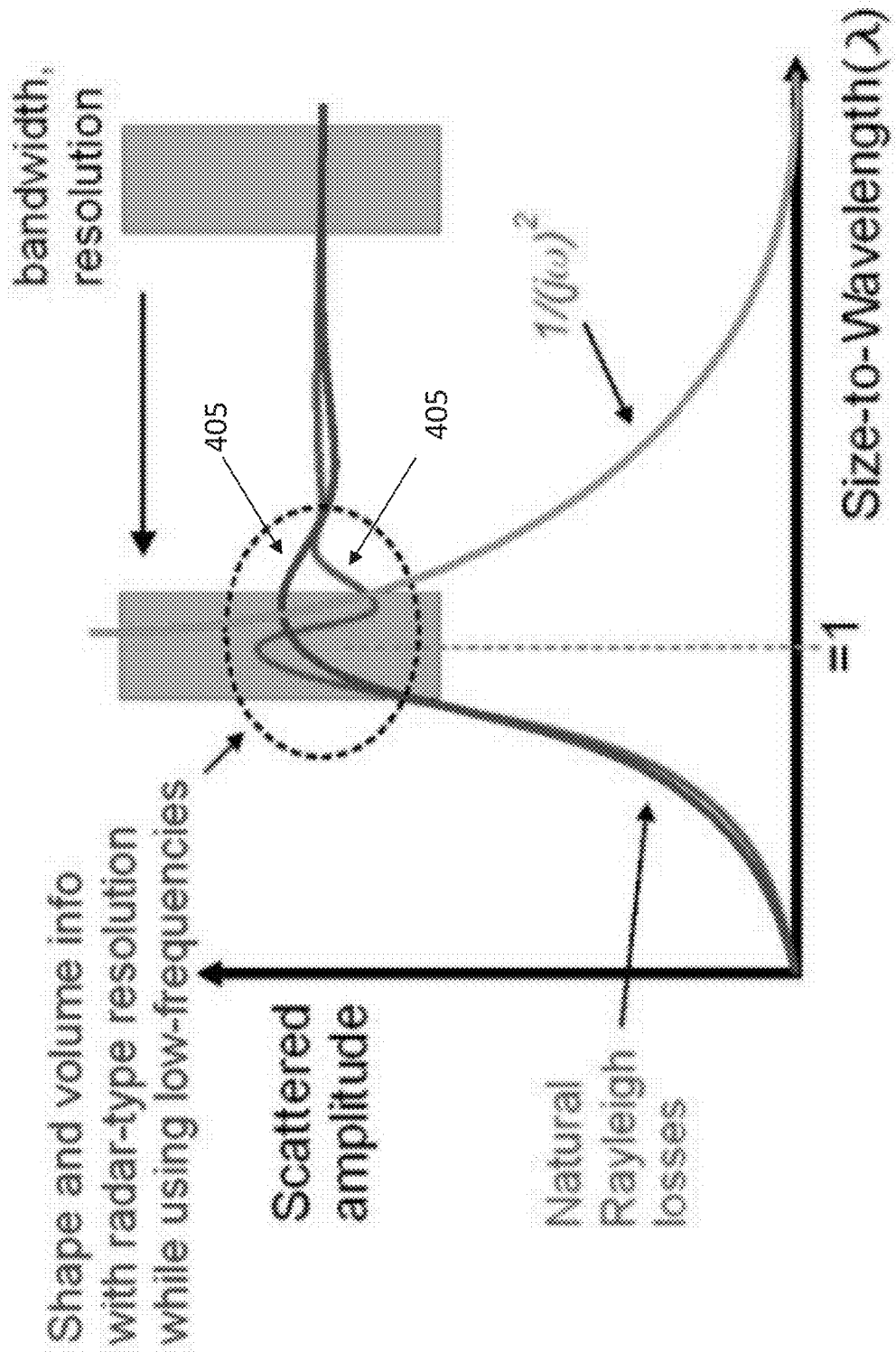

FIGS. 4-5 illustrate how the resonance technique described herein can detect shape and volume with resolution comparable to radar, while using lower frequencies than traditional sounding radars, thus enabling deeper penetration. FIG. 4 shows the three regimes of scattering, which include the resonance regime, Rayleigh regime and the wave (radar) regime. The two curves (405,410) show scattering from a sphere (405) and a non-spheroidal (410) target/scatterer. The Rayleigh scattering regime has only volume information because the scatterer is significantly smaller in size than the wavelength. Typical sub-surface detection techniques that use Rayleigh scattering include electrical resistivity techniques, which require multiple nodes (multiple sensors to detect the field) and can only resolve volume information of the target. The resonance scattering technique of the present disclosure can be used to detect dielectric structures and voids in the ground, such as man-made tunnels, because the scattering in this regime is decomposed into surface and volume scattering, where the volume scattering is dependent on internal scattering within the object or scatterer.

To study the physical attributes of electromagnetic resonance imaging, a technique to image using the near-resonance scattering regime was developed. The scattering was first verified using a finite element method (FEM) and the Method of Moments (MoM) full wave electromagnetic simulation for a conductor embedded within a dielectric background, and a set of simplified scattering experiments using a vector network analyzer (VNA) to measure the backscatter in the resonance regime. The simulation, using the conductor embedded within a dielectric background, demonstrated that the technique was capable of imaging conductors within low-loss dielectric background. The exemplary simulation results and measurements are illustrated in FIGS. 6-9.

Figure 6:
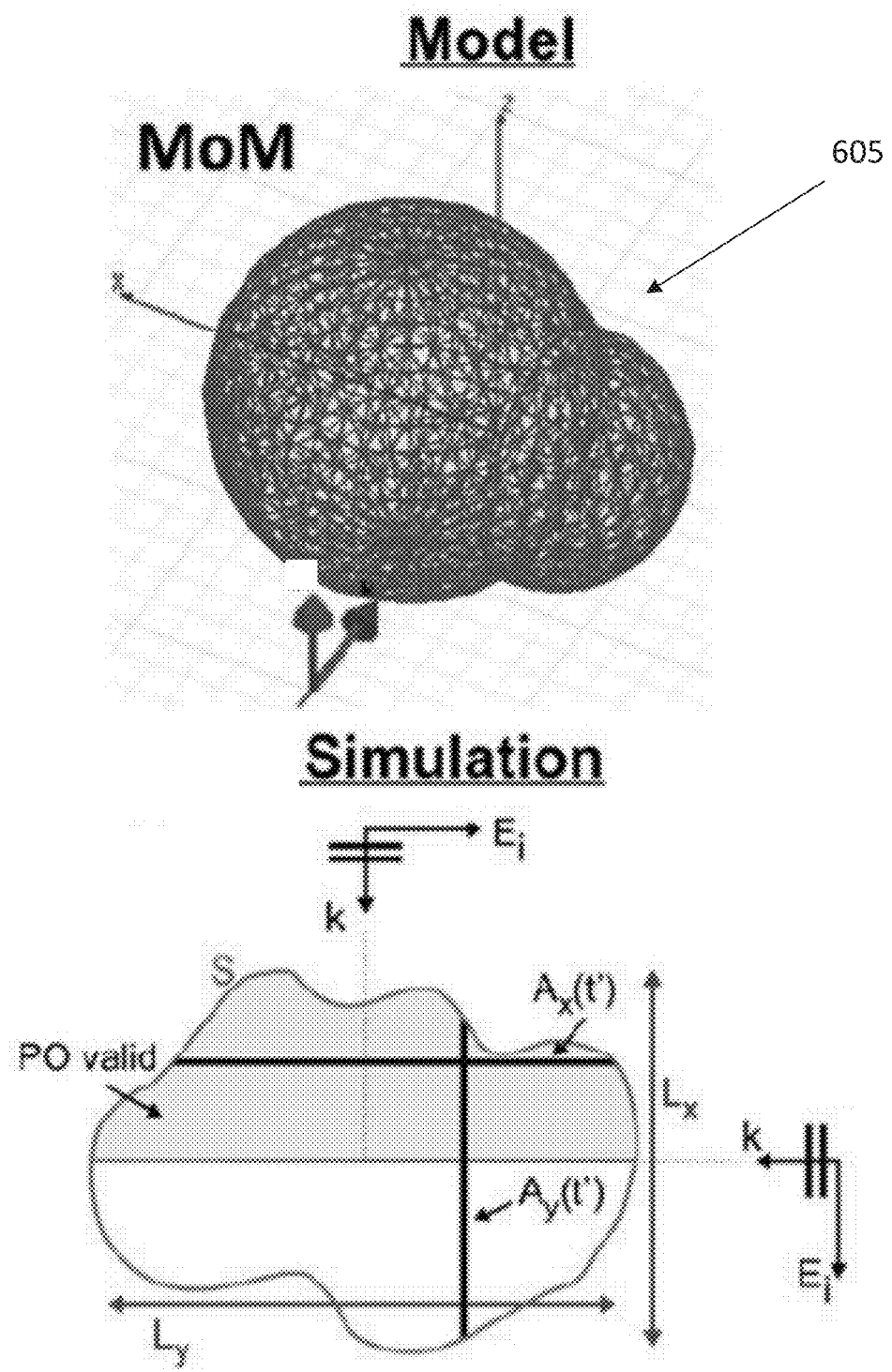
FIGS. 6-9 illustrate theoretical simulations using numerical electromagnetic codes to study the resonance scattering behavior of a sub-surface target.
Figure 7:
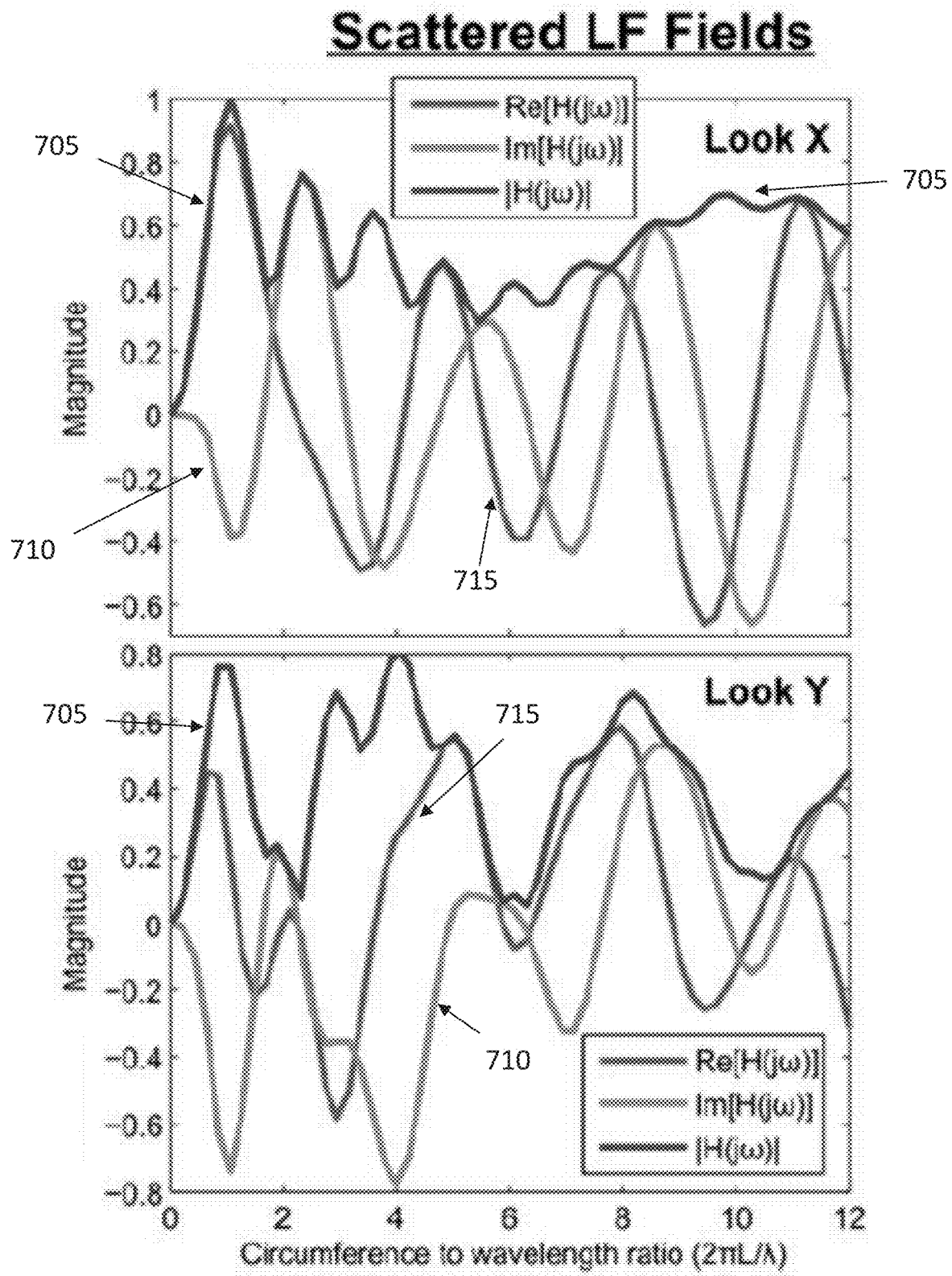

FIG. 6 shows the shape of the conducting model used for the FEM simulations. The body is located within dielectric media of infinite extent and two key looks are sampled. The excitation and detection of resonance scattering are sampled in two orthogonal directions. The dielectric background media is non-conducting for simplicity, and with a relative permittivity of 3. The geometric/physical optics (GO or PO) simplified description of the resonance scattering are valid in the front side of the shape as noted for the x direction. A similar front side GO or PO description is valid along the y direction as well, but is not shown in FIG. 6. The scattered fields in the resonant regime is shown in FIG. 7 for each look, labelled as looks x and y. Real, imaginary and magnitude of the normalized responses are shown, where the normalize responses can be termed as the transfer function, denoted by H in FIG. 7.

Figure 8:
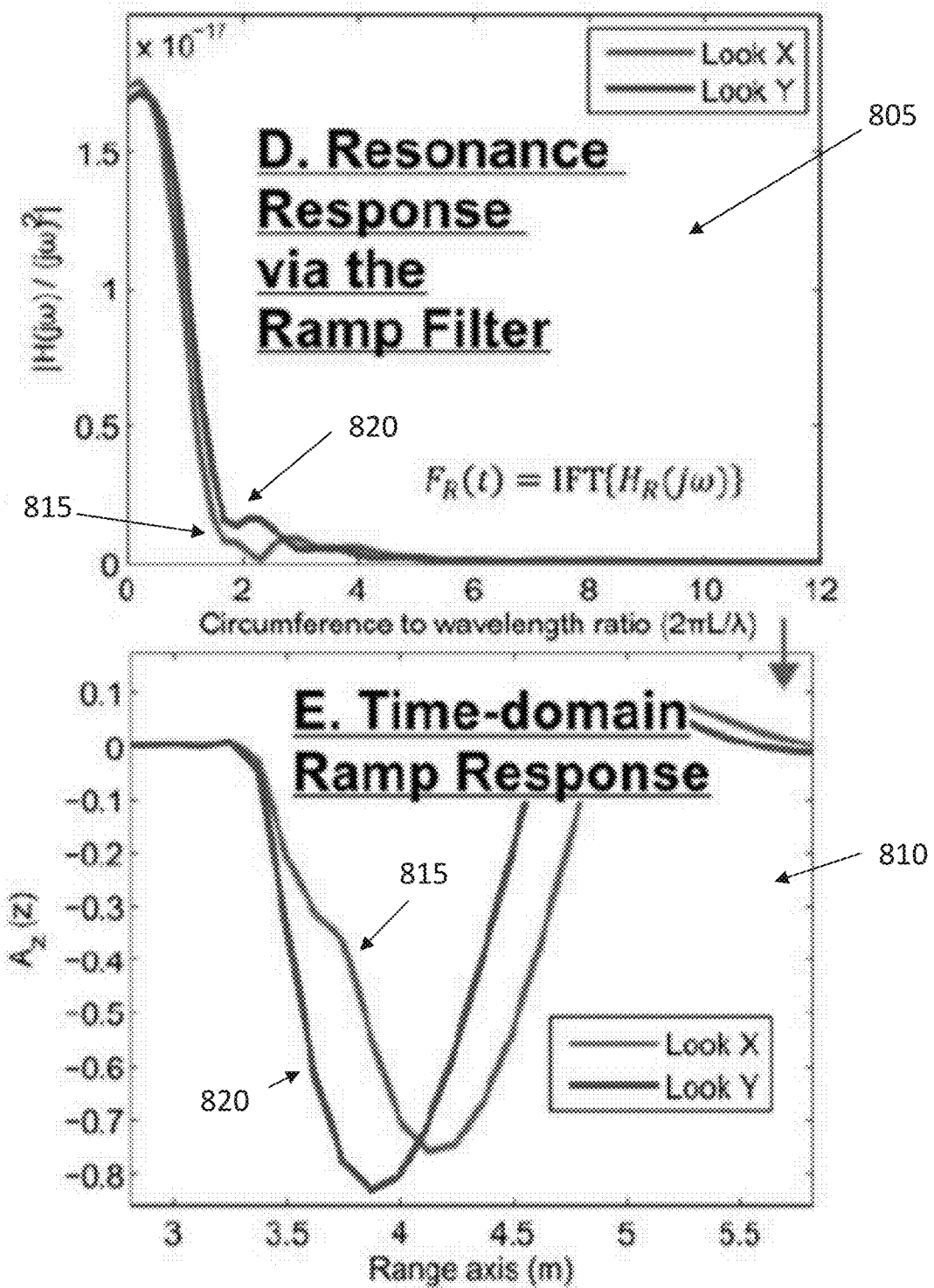

FIG. 8 shows the application of the ramp response, in the frequency/spectral domain (805). The inverted area/shape along each orthogonal look axis is shown in FIG. 8 as well (810). In FIG. 8, x looks (815) and y looks (820) are illustrated.

Figure 9:
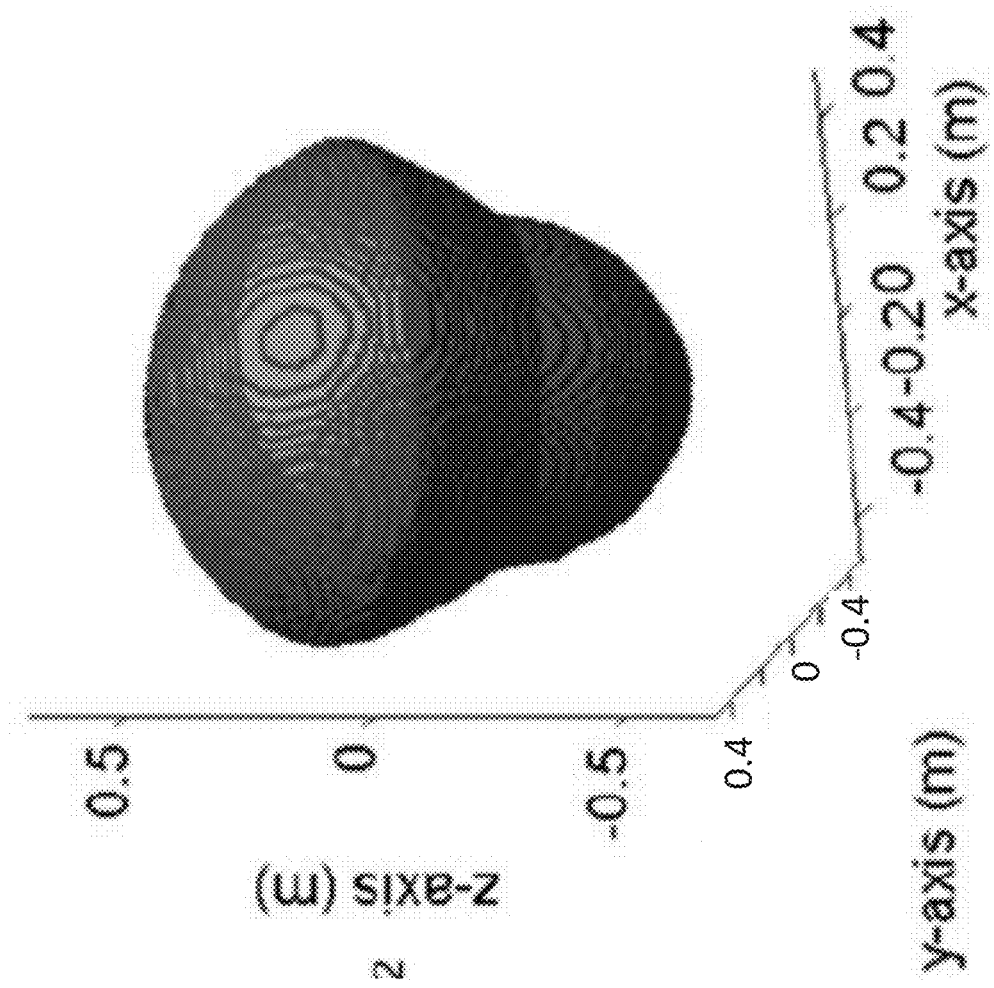

A simplified 3D reconstruction based on the two orthogonal look shape functions is shown in FIG. 9. FIG. 9, therefore, illustrates volumetric imaging of an exemplary object. The object being imaged is illustrated (605) in FIG. 6. Volumetric imaging can be achieved using resonance electromagnetic scattering via the ramp response, as illustrated in FIG. 8, even when the structure is embedded within a background dielectric media. The technique emphasizes lower frequencies (805) due to the ramp response—which can penetrate deeper into the ground than existing high-frequency pulse-based sounding radars. As mentioned before, the object model (605) simulated via the FEM and MoM numerical electromagnetic codes is a conducting target for simplicity, and background dielectric is loss-less with a background $\epsilon_r=3$ as a simplified proof-of-concept simulation.

These results use structures that can be readily simulated via FEM/MoM techniques and show good agreement between theory and measurements. To study bodies embedded in lossy sub-surfaces, an exemplary set of experiments and techniques was developed to study the resonance scattering behavior in sand with particles in the 0.1-0.45 mm size, and in free space (without sand). The key purpose of these experiments is to first show or demonstrate that the resonance scattering behavior of targets/obstacles/scatterers are strongly dependent on their shape, structure, and dielectric properties. This was best demonstrated using frequency domain measurements, using an array of frequencies to study the behavior near resonance. Due to multiple scatterings in the laboratory environment, a technique of time domain gating in the frequency domain was used via the Fourier transform in order to isolate scattered fields from the object only. To simplify the problem, the measurement approach was to scale the structure and size down, which correlated to a scaling up of frequency measurements. This enabled compact experiments in a laboratory environment. To simplify the study, the experiments used target/body structures that could be easily modelled theoretically, such as spheres and spheroidal structures/bodies. The following targets and bodies were used: (1) metal sphere; (2) medium-loss dielectric sphere; (3) low-loss dielectric sphere; (4) water-filled sphere. Measurements were conducted both in free space and embedded in sand.

Figure 10:
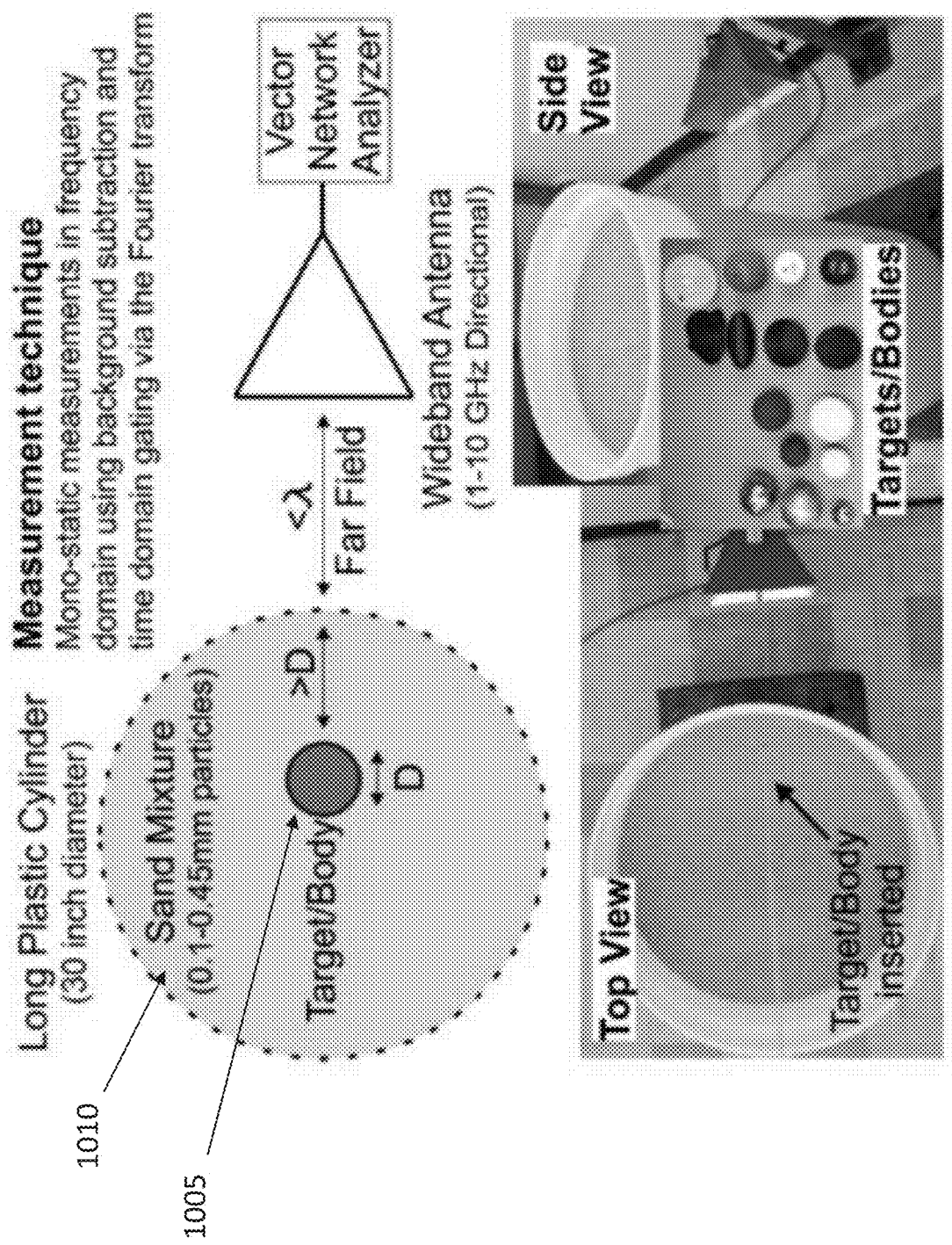
FIGS. 10-17 illustrate different objects embedded within a background lossy-dielectric medium, and detected or imaged using sensed resonance scattering as exemplary applications of the methods of the present disclosure.
Figure 11:
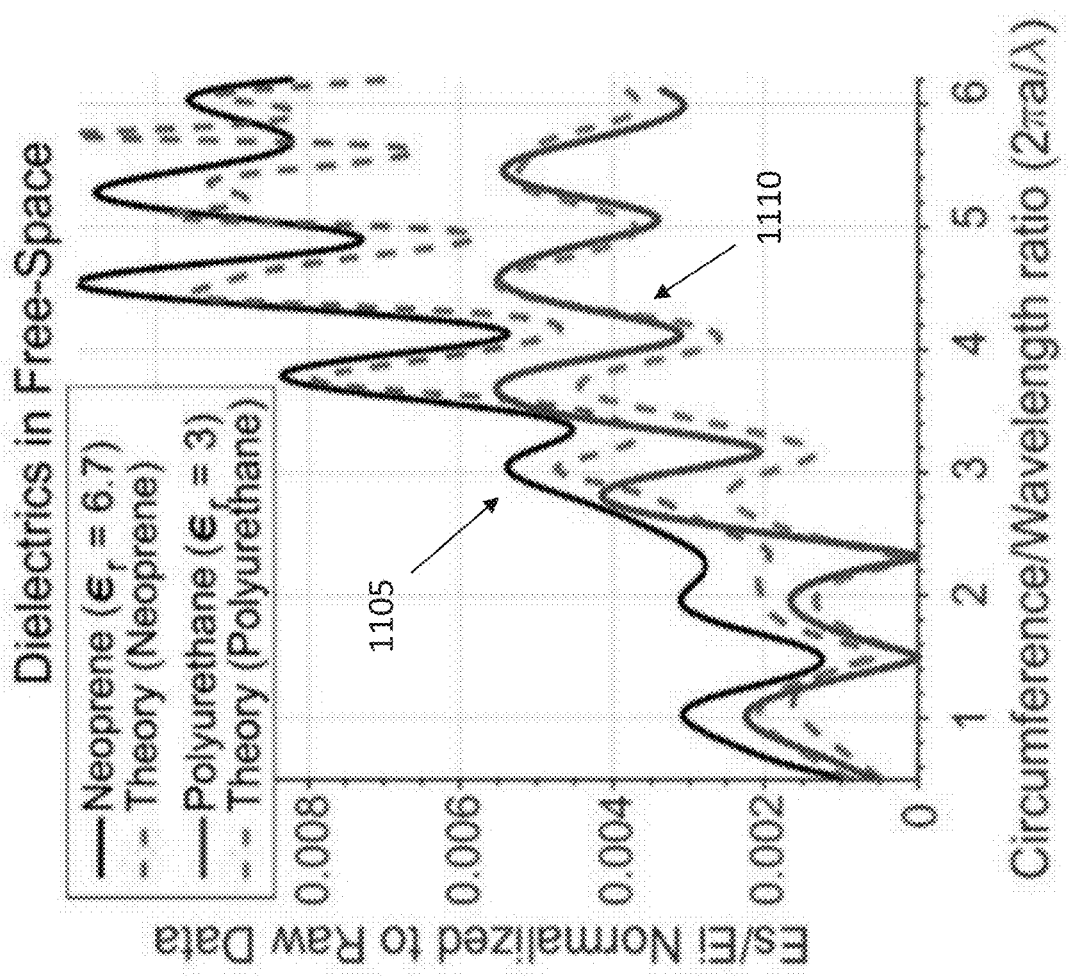
Figure 12:
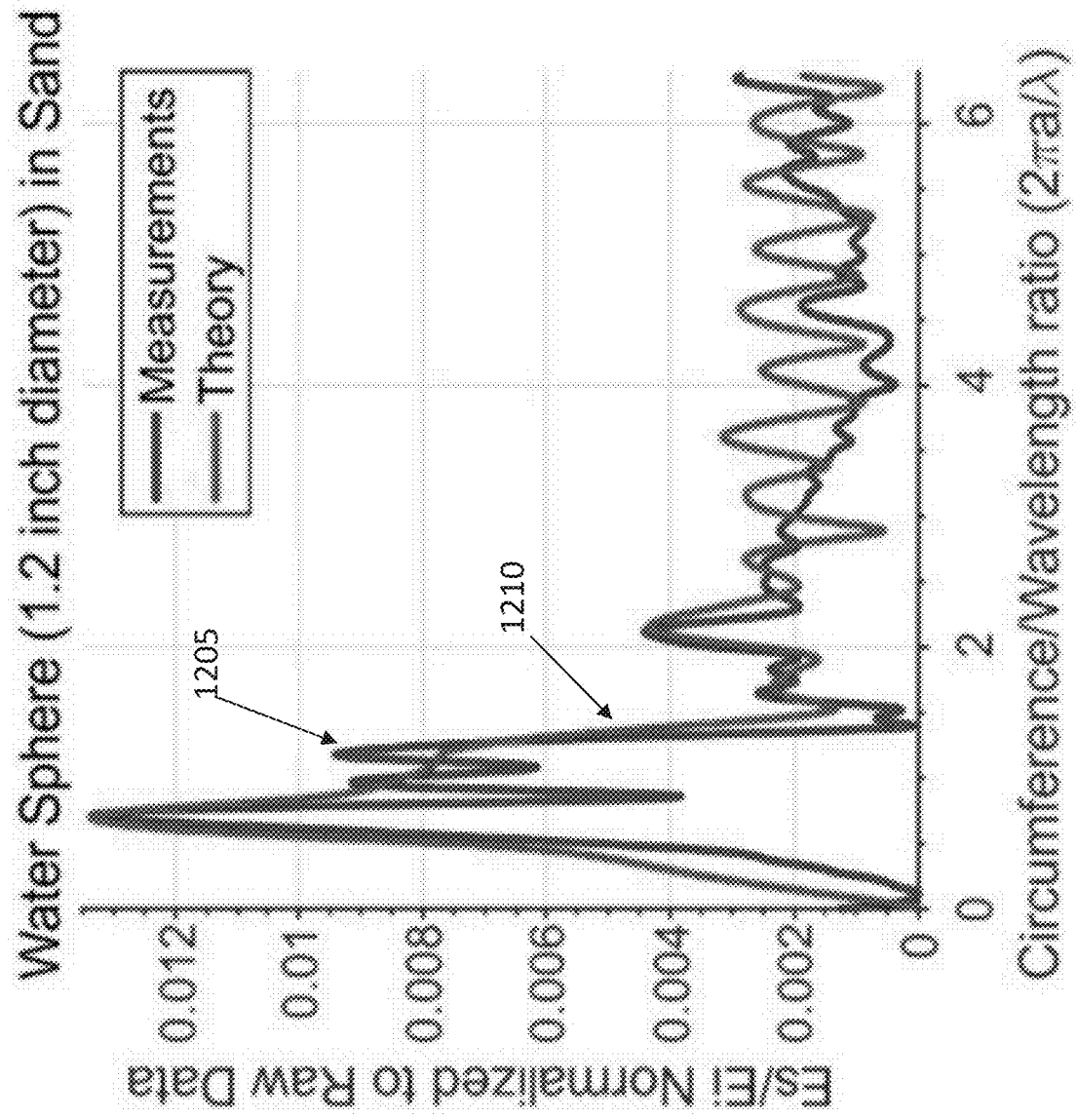

The measurements illustrated in FIGS. 10-12 showed good agreement with the theoretically predicted resonance scattering curves, both in free-space and in the sand (lossy dielectric), and demonstrated that dielectric bodies including water bodies scattered strongly in the resonance regime, even when located in the sand (lossy dielectric).

FIGS. 10-12 illustrate measurements of electromagnetic resonances in sand, conducted in a controlled laboratory environment. The technique uses a vector network analyzer operated on frequencies related to the resonance frequencies of the structure to be investigated. Various targets were studied in free space (without background lossy dielectrics such as sand) and embedded within the background lossy dielectric or sand. Some of the results are shown for both cases. An excellent agreement between theory and measurements is shown both in free space and in sand, where the artifacts of resonances are observed. FIG. 10 shows a summary of the measurement conducted, to measure the resonance scattering, for a body (1005) in a sand mixture (1010). The targets included spheroidal targets (sphere shapes) and non-spheroidal targets (non-sphere shapes). The non-spheroidal targets included amorphous targets as well, such as (1305) illustrated in FIG. 13). The measurement uses a wideband horn antenna to generate propagating electromagnetic waves with wavelengths comparable to the size of the targets/scatterers. A key need was that the targets be electrically far (or in the far field) from the antenna system. A vector network analyzer was used to generate and detect the scattered fields across all frequencies of interest that cover the resonance regime. FIG. 11 shows the scattered fields in the resonance regime for two dielectric bodies, neoprene (1105) and polyurethane (1110), that are spheroidal in shape. Due to low losses in the dielectric bodies, the resonance scattering occurs inside the target. This is due to the majority of energy coming in the far resonance regime (circumference/wavelength ratio greater than one). FIG. 12 shows a dielectric target (tap water) embedded in sand, where the most scattered energy is located in the ideal resonance regime (circumference/wavelength of about one). FIG. 12 illustrates measurements (1205) and theoretical results (1210). The results of FIG. 12 are due to the attenuation of the internal resonance scattering (internal to the target) that is attenuated due to higher frequencies and scattering losses. In both FIGS. 11 and 12, the theoretical descriptions of electromagnetic scattering are well behaved due to operation in the resonance regime, and agree well with the measurements.

Figure 13:
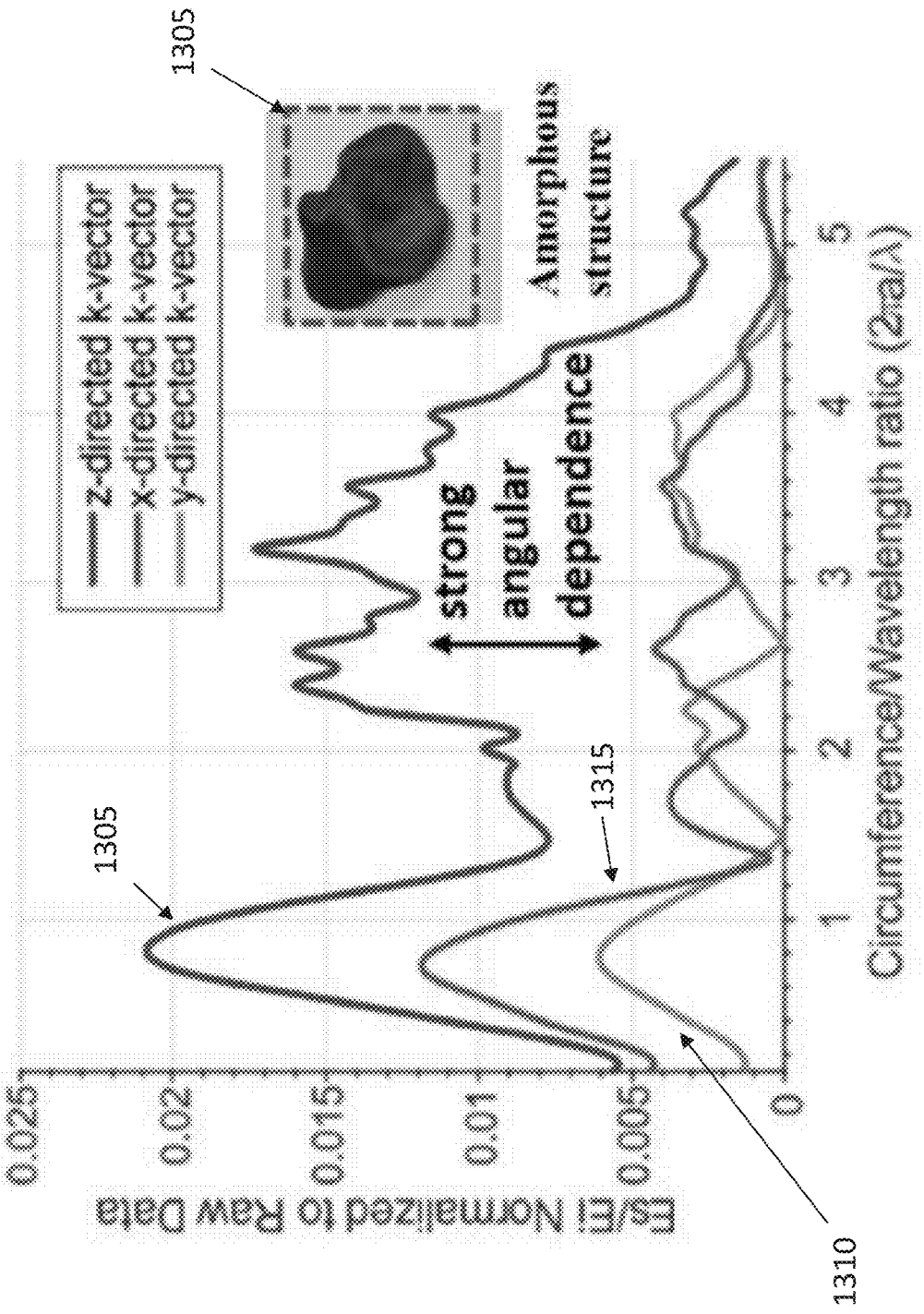

Additional experiments were conducted to demonstrate the capability to detect and sense amorphous structures using simple 3D printed dielectric amorphous bodies. The results, illustrated in FIG. 13-16, showed a strong angular dependence within the resonance scattering regime, and a strong sensitivity of resonant mode to polarization suggesting that the detection of amorphous dielectric bodies deep in the sub-surface using resonance scattering can produce information on the shape, structure, and dielectric properties of the embedded dielectric body. Similar results were obtained for water filled amorphous structures. FIG. 13 illustrates the z-directed vector (1305), the x-directed vector (1315), and the y-directed vector (1310).

Figure 14:
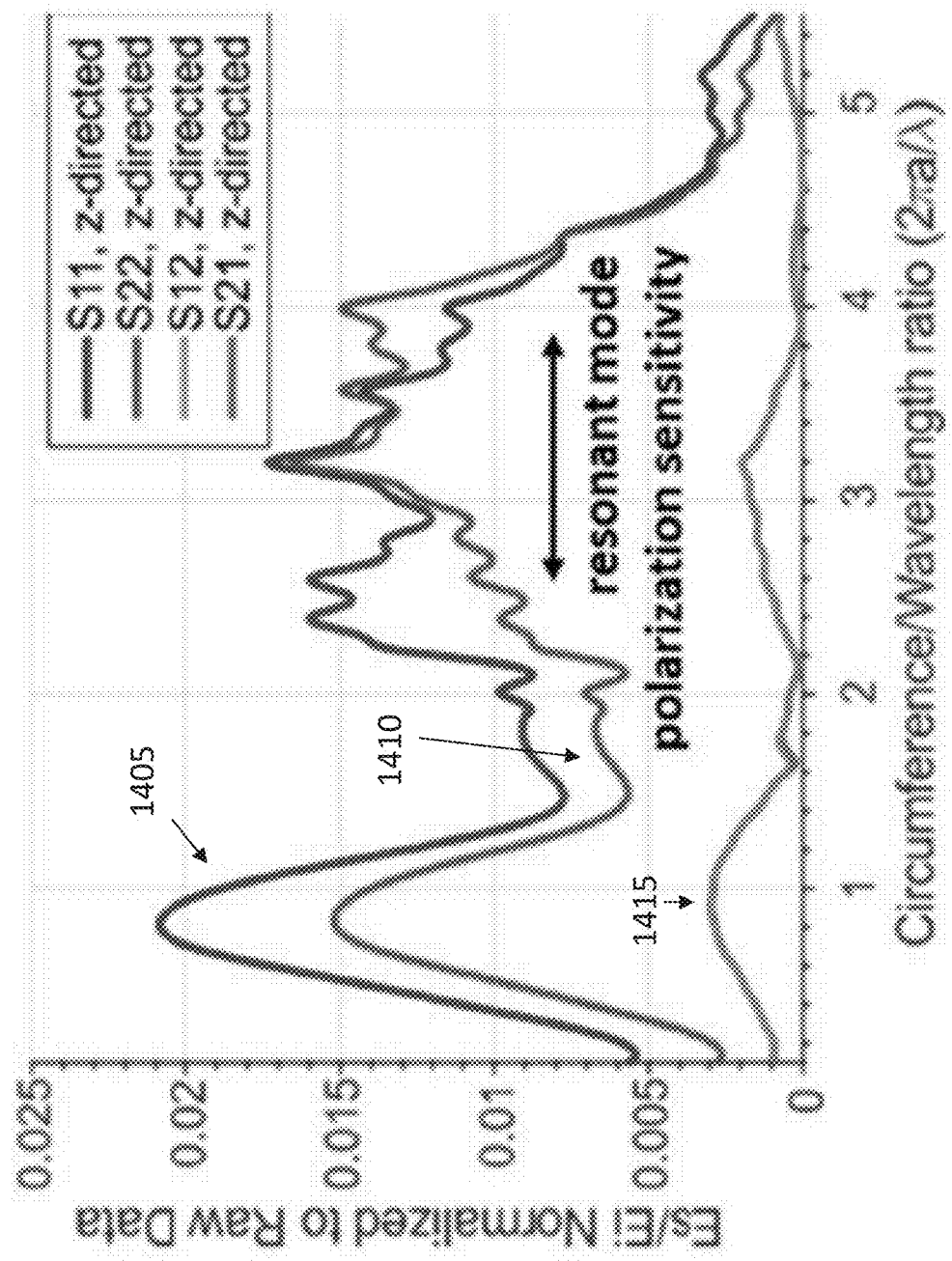

FIGS. 13-14 illustrate measurements of electromagnetic resonances of amorphous dielectric structures (3D printed structures that are non-spheroidal), embedded in a lossy-dielectric or sand, to demonstrate the capacity to detect shape, structure, and dielectric properties. As noted before with reference to FIG. 12, the resonance scattering is high at the circumferential/wavelength ratio of one, which implies that the shape has some resemblance to a spheroidal target. However, strong differences are noted in the x-directed scattered fields, y-directed scattered fields, and z-directed scattered fields, suggesting that the orthogonal scattered fields are strongly dependent on both dielectric properties and shape.

FIG. 14 shows that de-polarization can be used to infer shape information to help constrain the inversion for the shape of the structure. Theoretical inversion techniques based on numerical electromagnetics (such as method of moments, finite element methods, et cetera) can be used to obtain a forward model (theoretical curves) of the resonance scattered transfer function or normalized scattered fields. The forward model of the scattering can be used to invert for shape and dielectric properties of the body/target/scatter similar to that discussed above in the present disclosure. Even complicated amorphous bodies such as those of FIGS. 13-14 can be inverted to find their shape and dielectric properties. For complicated structures such as the amorphous structures, the simplest inversion strategy is to solve for shape and dielectric by numerically minimizing the error between the forward theoretical model and the measured quantities shown in FIGS. 13-14 as an example. This numerical minimization is similar to a least square optimization technique where the shape and dielectric properties is found by numerically minimizing the error between the theoretical or simulated and measured responses. FIG. 14 illustrates the S11 data (1405) and the S22 data (1410), while the S12 and S21 curves overlap (1415). Here S11 and S22 refer to co-polarized scattering and measurements, with S11 being orthogonal to S22, while S12 and S21 are cross-polarization measurements.

Figure 15:
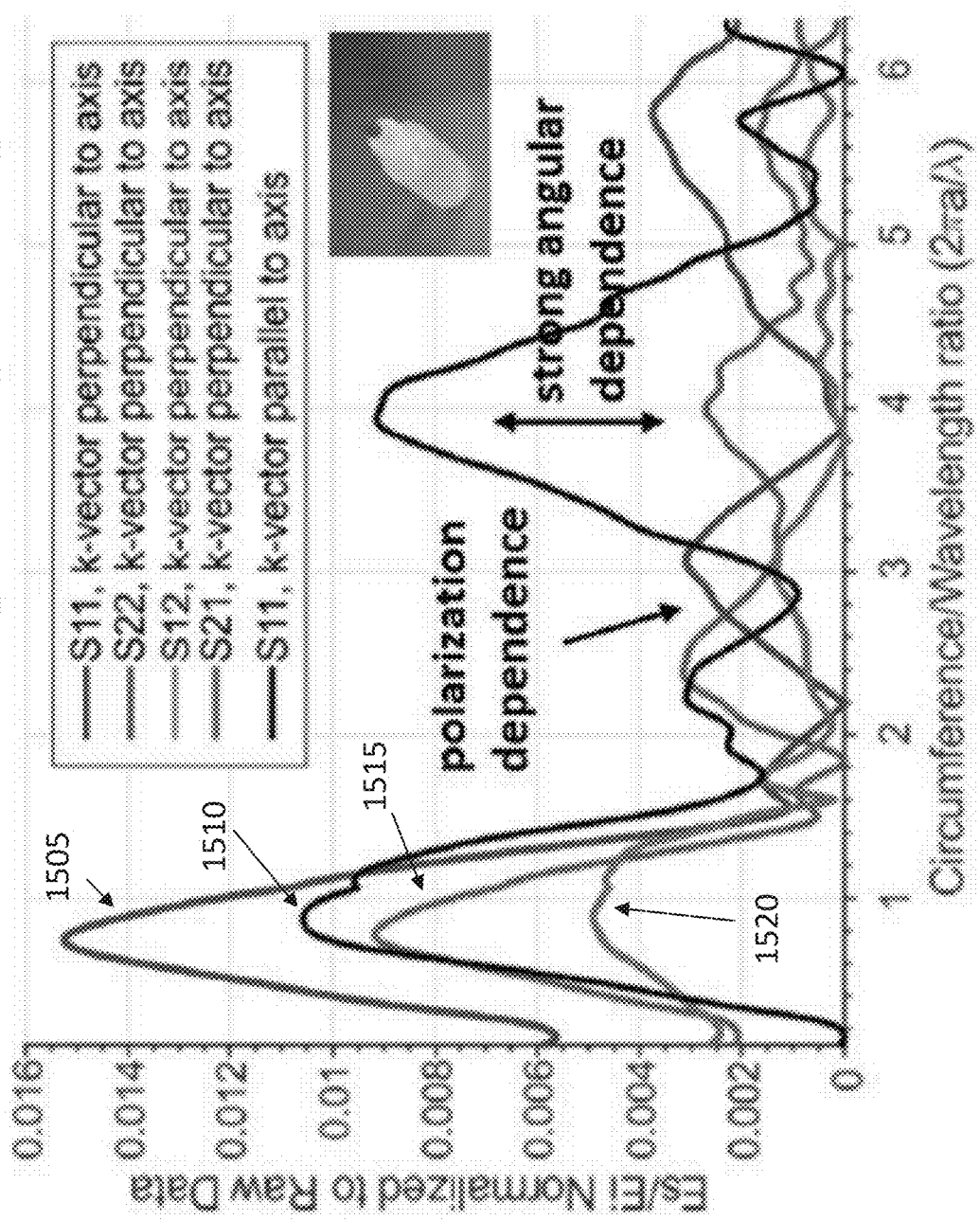
Figure 16:
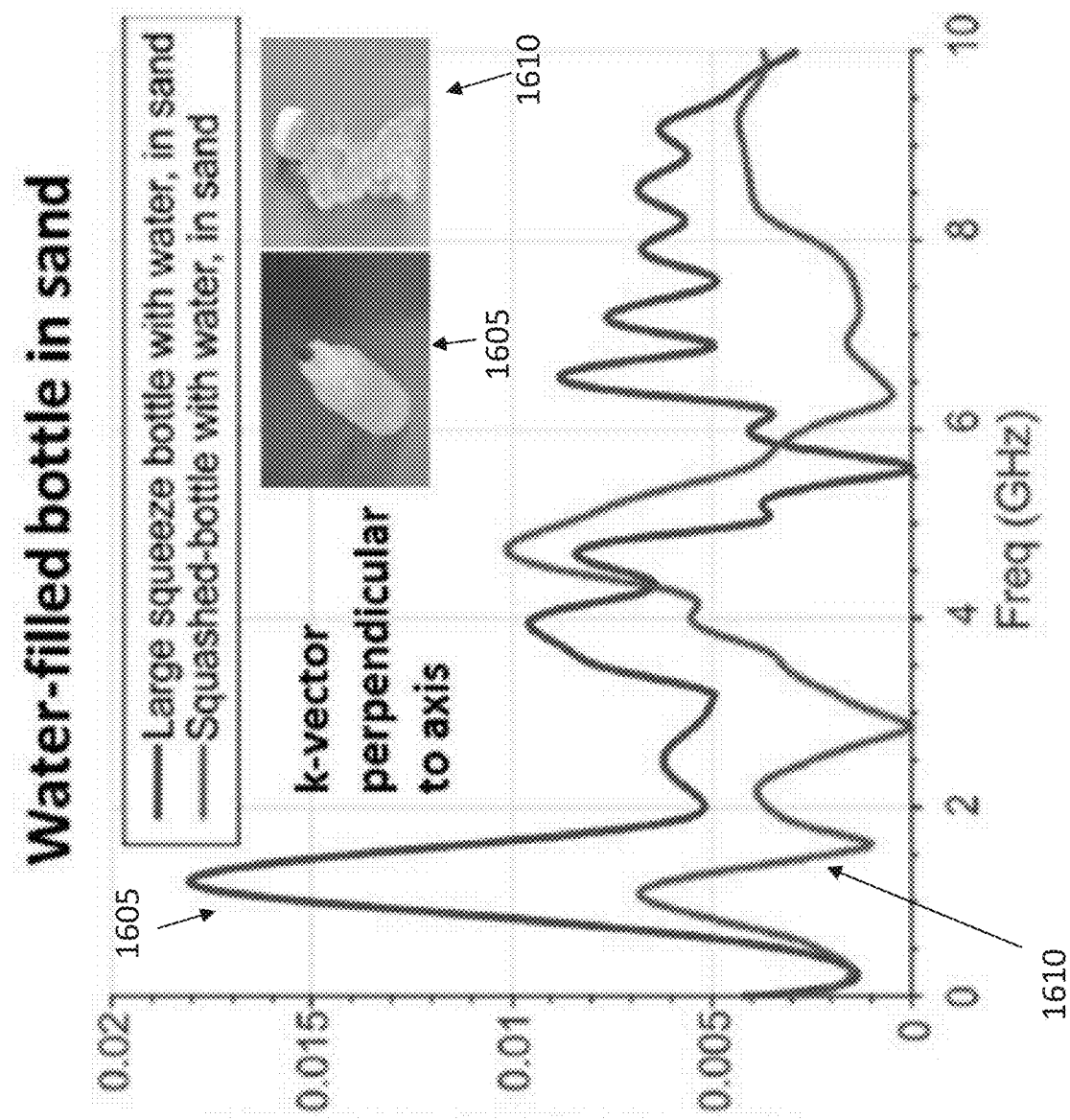

FIGS. 15-16 illustrate measurements of electromagnetic resonances of water-filled amorphous structures (e.g. a water bottle) embedded in a lossy-dielectric or sand body, demonstrating the capacity to detect shape, structure, and dielectric properties. The results are similar to that found in FIGS. 13-14, where the polarization and angular scattering dependence is shown to have a significant impact in the resonance regime, and thus can be used to detect shape and dielectric properties of these sets of structures. FIG. 15 illustrates the perpendicular S11 data (1505), the parallel S11 data (1510), and the S22 data (1515), while the S12 and S21 data curves overlap (1520). FIG. 16 illustrates data for object (1605) and (1610). Object (1605) is a squeeze bottle filled with water, while object (1610) is a bottle filled with water and squashed.

Cylindrical cavity scattering functions in the sub-surface of lossy-dielectrics mediums by radio- and micro-wave scattering has been thoroughly investigated in the past. A majority of the research has focused on the development of theoretical and numerical techniques to simulate the pulse response of the cylindrical cavity. In the following, an experimental study of a cylindrical cavity detection technique is described, using resonance mode frequencies. The following demonstrates that resonance scattering can be used to detect tunnel structures that are represented as dielectric voids embedded within background dielectric media. The long wavelengths associated with the resonance scattering of the large tunnels have lower propagation losses, and thus permit detection at greater depths than traditional pulse response used in traditional radar or sub-surface radar techniques.

The method described herein uses reflection patterns that arise from the electromagnetic resonance pattern of the transverse electric (TE) and transverse magnetic (TM) modes within the cylindrical cavity (the dielectric void), to provide unique solutions for cylinders of different radii. The scattering regime is focused at the lower-frequencies, where the TE and TM modes suffer mismatch due to different resonance scattering behavior. The purpose of this technique is the use of lower frequency resonance modes, to detect shape and location of cylindrical cavities, compared to typical radar approaches, such as in ground-penetrating radars (GPRs) that typically require high-frequency wideband responses. By studying the TE and TM mode mismatch through a ratio of the two modes, the unknown loss factors due to different sub-surface environments can also be removed or calibrated. The removal of the loss factors offers an additional advantage over traditional GPRs that require wideband calibrations of the scattering in sub-surfaces. Since the dielectric cylinder has several internal resonance frequencies, only the first three resonance frequencies of both TE and TM are studied for a unique solution, hence ignoring the higher order resonance frequencies which asymptotically approach the optical scattering regime where the mismatch between TE and TM is expected to reduce.

Figure 17:
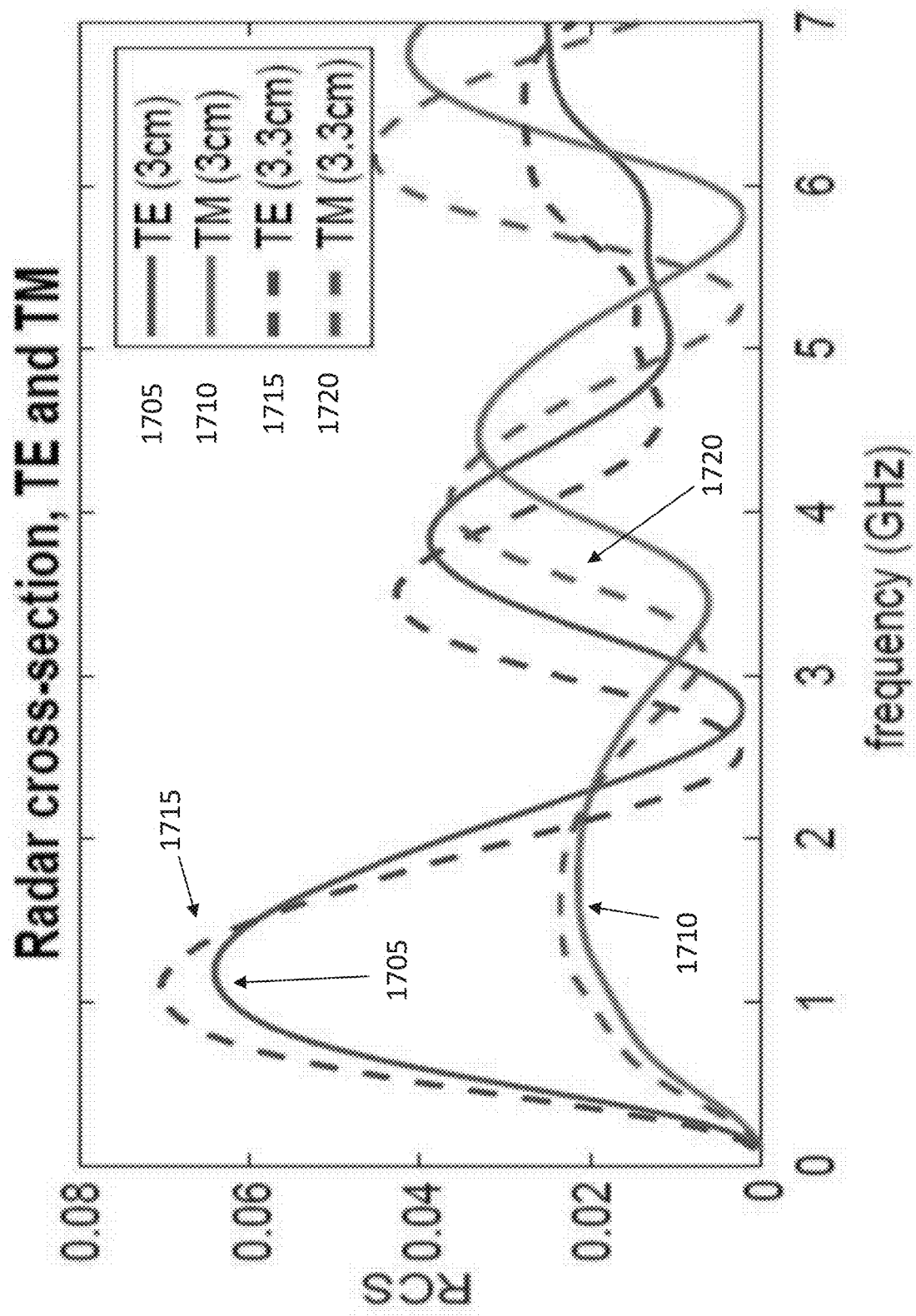
Figure 18:
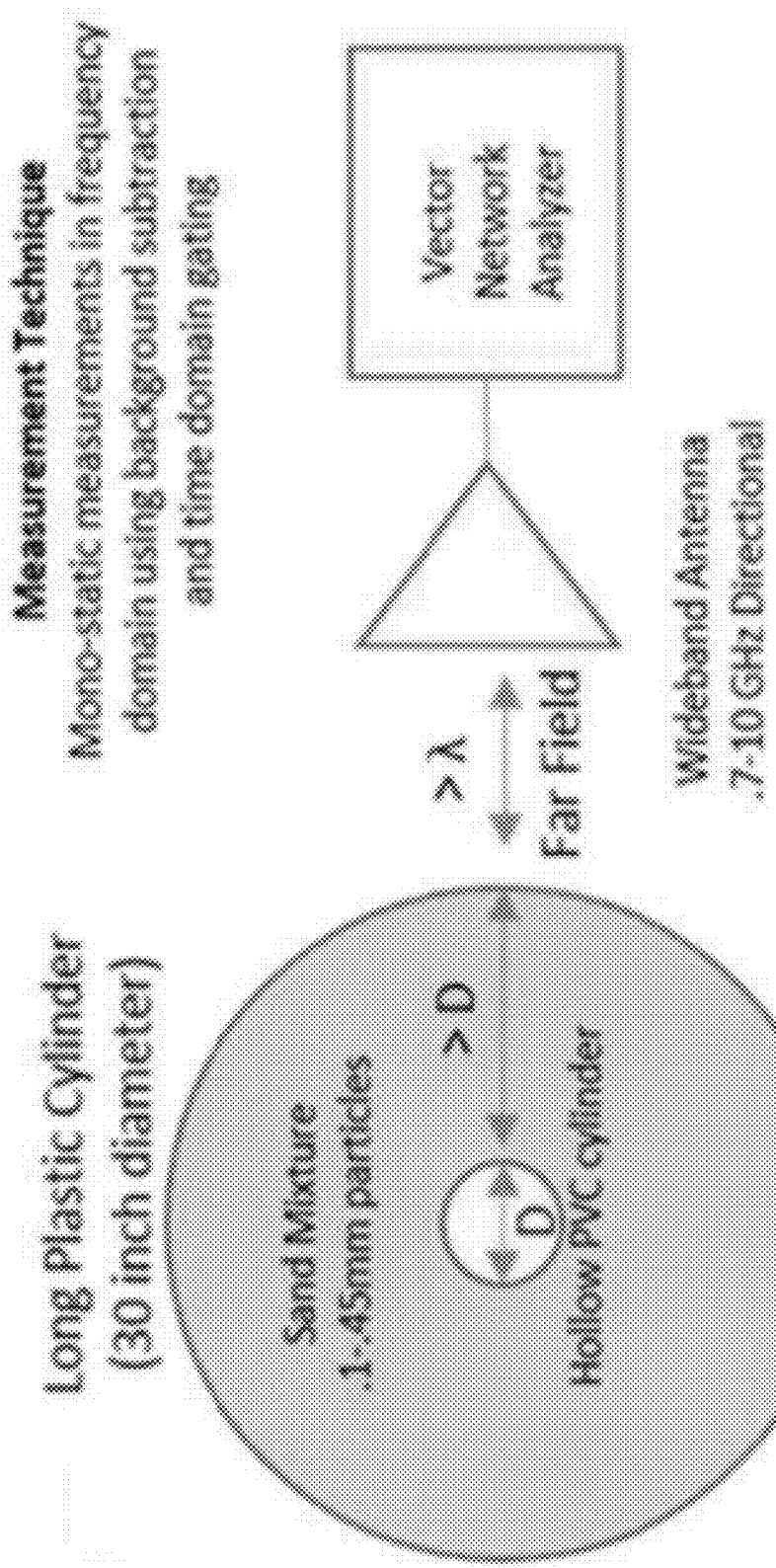
FIG. 18-19 illustrate experimental results for hollow structures, or voids, such as a tunnel embedded within a lossy-dielectric background medium, and a comparison between theoretical and experimental results for the dielectric void.

The plane wave responses for the TE and TM modes are given by:

$$Es(TE) = \sum_{-\infty}^{\infty} \frac{NJ_n(k1a)\left(J_{n-1}(k2a) - \frac{n}{k2a}J_n(k2a)\right) - J_n(k2a)\left(J_{n-1}(k1a) - \frac{n}{k1a}J_n(k1a)\right)}{J_n(k2a)\left(H2_{n-1}(k1a) - \frac{n}{k1a}H2_n(k1a)\right) - NH2_n(k1a)\left(J_{n-1}(k2a) - \frac{n}{k2a}J_n(k2a)\right)} e^{in\phi} H2_n(k1p)i_n$$

and $$Hs(TM) = \sum_{-\infty}^{\infty} \frac{\left(\frac{1}{N}\right)*J_n(k1a)\left(J_{n-1}(k2a) - \frac{n}{k2a}J_n(k2a)\right) - J_n(k2a)\left(J_{n-1}(k1a) - \frac{n}{k1a}J_n(k1a)\right)}{J_n(k2a)\left(H2_{n-1}(k1a) - \frac{n}{k1a}H2_n(k1a)\right) - \left(\frac{1}{N}\right)*H2_n(k1a)\left(J_{n-1}(k2a) - \frac{n}{k2a}J_n(k2a)\right)} e^{in\phi} H2_n(k1p)i\_n$$

which give the strength of the field scattered Es (Hs) in a direction $\phi$ from the cylinder for a plane wave incidence perpendicular to axis of cylinder, with a dielectric ratio between the medium outside the cylinder to the medium of the cylinder (N), and propagation constant k1 and k2 of the medium outside and inside the cylinder, respectively. The theoretical monostatic reflection radar cross section (RCS) is shown in FIG. 17 for a cylinder with a radius of 3 cm in a dielectric sub-surface ($\varepsilon_r$=5). The sensitivity of an increment of the radius to 3.3 cm produces 100 MHz shift in the first resonance frequency. For a larger cylindrical cavity of 1 meter radius, the 3$^{rd}$ resonance frequency occurs at 205 MHz. FIG. 17 illustrates the RCS theoretical results for a cylindrical void/cavity with a radius of 3 cm and a radius of 3.3 cm, embedded within a background lossy-dielectric (sand). The experiment was conducted in the laboratory using a hollow 3 cm radius PVC pipe, a vector network analyzer and a dual pole antenna. The scattered data was collected at a frequency of about 0.5-7 GHz using the vector network analyzer. FIG. 18 illustrates the transverse electric (TE) results for 3 cm (1705), the transverse magnetic (TM) results for 3 cm (1710), the transverse electric (TE) results for 3.3 cm (1715), and the transverse magnetic (TM) results for 3.3 cm (1720). FIG. 18 illustrates a block diagram of the experimental setup to enable resonance TE and TM scattering.

Figure 19:
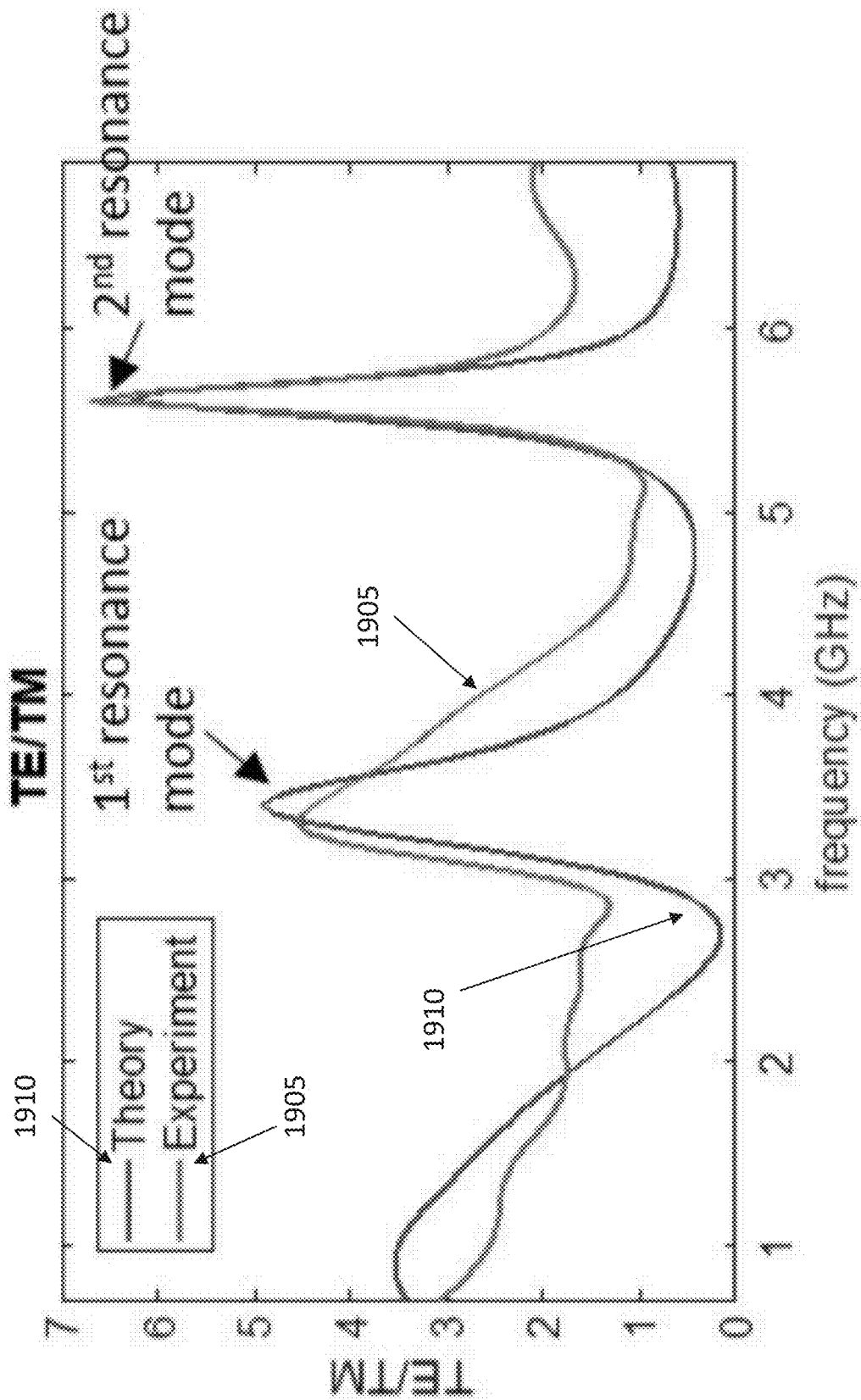

The TE responses and TM responses were measured by taking the reflection response of the cylinder in the sand, compared to pure sand with no cylinder, in order to obtain a reflection response due to the cylinder. The TE and TM were divided to show a unique pattern at the particular radius while also cancelling the environmental loss factors associated with the sand, the antenna, and the antenna directivity. FIG. 19 illustrates the experimental results (1905) for the resonance scattering modes, compared to the ratio of the theory TE and TM (1910), showing good agreement between experimental and theoretical modes.

The results show that the division of the TE and TM gives unique peaks at different frequencies, and these peaks are distinguishable in the experimental data. These results can be extended to rods with larger or smaller radii, which can provide curves of the ratio of TE to TM that are exactly the same in shape, but scaled down in frequency with increase in radius of cylinder.

The experimental data shows that taking the ratio of the TE to TM scattering in the low-frequency resonance modes permits the detection of the cylindrical cavities in the sub-surface, and the sensing of the radii of the cylindrical cavity. Applications of the method include detection of cylindrical shaped objects underground such as tunnels, bunkers, underground cavities, et cetera. As known to the person of ordinary skill in the art, the loss factor of the propagating wave varies greatly with frequency, type of soil and moisture content of soil. However, a simple analysis is sufficient to study an order of magnitude of propagation loss: Typical man-made tunnels are of the order of 2 m in diameter. For a 2 m diameter cylindrical cavity, resonant mode scattering of the first mode occurs at a frequency of about 48 MHz. Known data of soil attenuation implies that, for low loss soils with a moisture content of 0-9% such as Brookhaven, N.Y., the loss factor at about 50 MHz is shown to be within 0.6-2 dB/m. This indicates that with a measurement dynamic range of about −100 dB (which is a common figure of merit for radars) it is possible to detect the 2 m diameter cylindrical cavity at a range of 25-83 meters deep.

The measurements described in the present disclosure showed good agreement with theoretically predicted electromagnetic resonance scattering curves for lossy-dielectric bodies, including water bodies located in the sub-surfaces of sand or lossy dielectrics. The experimentally collected results demonstrate that resonant electromagnetic scattering of dielectrics located in the sub-surface of media or ground is measurable and can be used as an electromagnetic remote sensing technique to detect the structures. The technique can also be applied to dielectric voids such as man-made tunnels.

Both measurements and theory agree and point conclusively to the fact that resonance scattering is physical and observable. Resonance electromagnetic scattering can be very effective on ground or airborne radar sensors because it has multiple benefits over existing techniques, including: ability to penetrate deep into ground (due to lower frequencies used to excite resonances), ability to accurately and distinctively measure dielectric properties (very sensitive to permittivity and conductivity), and ability to measure accurately the shape of dielectric bodies embedded in ground (very sensitive to the shape of structures).

In some embodiments, the methods of the present disclosure comprise some or all of the steps described in the following. The method can comprise generating narrowband electromagnetic waves to excite a remote target or object, where the target or object has a perimeter or size comparable to the wavelength. The method can comprise transmitting the narrowband waves to the object or target using multiple orthogonal linear polarizations of the electromagnetic wave, accomplished using a radiating antenna structure with orthogonal excitations. The method can comprise detecting the scattered resonant fields from the object or target at multiple polarizations using an orthogonal receiving antenna. The object can be located below ground or in the sub-surface, and be embedded within the lossy-dielectric media such as soil or sand. The object can be a dielectric structure with or without loss, or a dielectric void including air, such as a tunnel. The object can have any shape and be distributed or non-distributed. The object size or perimeter is about a fraction to about two or three times in length of the narrowband wavelengths. The object to be detected can be known a priori, therefore the size is known, and resonant wavelengths can be pre-calculated.

The method can comprise normalizing the transmitted amplitudes, and then taking the ratio of the received complex resonant scattered fields of one polarization relative to another polarization, to measure or detect the object or target and its presence in the sub-surface or ground. The low attenuation losses in the material are removed from the calculations due to mathematical cancelation by the ratio of the two quantities. A constant threshold can be used to determine if the target or object is present or not in the sub-surface. The constant is determined empirically, or numerically by accounting for instrument and thermal noise and scattering losses of the background medium.

The method can comprise repeating the steps above for all narrowband frequencies covering the near-to-far resonance scattering frequency range. The range can be about 0.2 to about 3 times the length of the resonant narrowband wavelengths. The frequency can be swept using a linear or non-linear method. The frequency step size is smaller than the speed of light divided by two times the depth to the object or target in the sub-surface, to remove range ambiguity in the response. The method can comprise applying a ramp filter in the frequency domain to obtain the spectral domain ramp response. The method can comprise multiplying the resonance response by $(j\omega)^{-2}$, where j is an imaginary unit, and $\omega$ is the radial frequency.

The method can comprise applying an inverse Fourier transform to transform the spectral domain ramp response to a time domain ramp response, giving the surface area function of the target in the depth direction, as a function of time. The method can comprise converting the time axis in the inverse Fourier transform to a depth range axis, by multiplying the time by the speed of light and dividing by a factor of two, to account for two way propagation.

The method can comprise repeating the above steps for each of the orthogonal polarizations measured, to obtain the area function vs range for the target that is non symmetric along the range or time axis. The response of each polarization gives the area function as a function of depth or range in the polarization direction.

The method can comprise repeating the above steps for more than one look angle, where a look angle is defined by the angle made by the range axis to the unit cross-product of the two orthogonal polarization received. Up to three unique look angles can be used to obtain scattering along the axis of the each polarization, and along the axis perpendicular to the unit cross-product of the two orthogonal polarizations. This gives the area function as a function of range in the respective look angle directions. The above steps can be used to obtain the shape of a target in one, two, or three dimensions.

The method can comprise detecting the range to the target or object by measuring the range to the interface or threshold amplitude in the area function curve as a function of range as obtained through the above steps. The method can comprise combining multiple looks using the above steps to obtain a range in each look, direction, and location of the object or target.

The method can comprise detecting the bulk relative dielectric permittivity of the object by measurement of higher order modes in resonance scattering, and minimization of error between theory or numerical calculation of higher order scattering in the resonance regime compared to the measurements. The above steps can be applied while sweeping the frequency over a range between 0.2 to about 3 times in length of the resonant narrowband wavelengths. The above steps can be applied to find resonant responses over all frequencies within the narrowband of the near-to-far-resonance. The method can comprise numerically minimizing the error between the forward theoretical model and the measured higher order resonant modes. The least square optimization technique can be used, where the bulk relative dielectric permittivity is found by numerically minimizing the error between the theoretical or simulated and measured responses The method can be applied to an object or target which can be a good or weak conducting target or object located within a lossy or lossless dielectric background medium. The object can be a second conducting or dielectric body located within the first outer dielectric body which is embedded in the background dielectric medium. The object can be a second conducting or dielectric body located within the first outer dielectric void body, such as an air filled tunnel, which is embedded in the background dielectric medium.

In some embodiments, the wavelength perimeter is defined as any perimeter of a cross section of the three dimensional object. In some embodiments the present disclosure describes very low frequencies as those that correspond to 0.2-3 wavelength perimeters or lateral dimensions of the object to be imaged. In the present disclosure, an object to be imaged can generally be considered a target. For example, a void structure, such as a tunnel, can be considered an object. In some embodiments, the frequency transmitted towards the object is less than 1 MHz.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] Picardi, et al., 'Radar Soundings of the Subsurface of Mars', Science, vol. 310, pg. 1925 (2005).
[2] Daniels, D. J. (2004), Ground Penetrating Radar, Volume 1, 2nd edition, IET Radar, Sonar, Navigation, and Avionics Series.
[3] C. Chen and L. Peters, "Radar Scattering and Target Imaging Obtained Using Ramp-Response Techniques," in IEEE Antennas and Propagation Magazine, vol. 49, no. 3, pp. 13-27, June 2007.

What is claimed is:

1. A method comprising:
generating electromagnetic waves in a wavelength range, the electromagnetic waves having a plurality of orthogonal linear polarizations;
transmitting, by a transmitter, the electromagnetic waves to an object to be imaged; and
detecting, by a receiver and at each polarization of the plurality of orthogonal linear polarizations, electromagnetic waves scattered by the object,
wherein:
the object is located below ground and is embedded in a lossy dielectric material,
the transmitter and the receiver are located above ground, and
the wavelength range comprises wavelengths between 0.2 and 3 times a perimeter or lateral dimension of the object,
the method further comprising:
applying a constant threshold to determine if the object is present or not; and
determining the constant threshold based on thermal noise and scattering losses of the lossy dielectric material.

2. The method of claim 1, wherein the electromagnetic waves scattered by the object are resonant electromagnetic waves.

3. The method of claim 1, further comprising calculating resonant wavelengths of the object, and wherein the generating the electromagnetic waves comprises generating the electromagnetic waves at the resonant wavelengths.

4. The method of claim 1, wherein the object is void.

5. The method of claim 1, further comprising taking a ratio of two polarizations of the plurality of orthogonal linear polarizations, thereby cancelling attenuation losses.

6. The method of claim 1, wherein transmitting the electromagnetic waves comprises sweeping a wavelength over the wavelength range.

7. The method of claim 6, wherein the sweeping the wavelength is linear.

8. The method of claim 7, wherein the sweeping the wavelength is based on a wavelength step size, and a frequency step size corresponding to the wavelength step size is smaller than a speed of light divided by two times a depth of the object from ground level.

9. The method of claim 1, further comprising applying a ramp filter in a frequency domain to obtain a spectral domain ramp response.

10. The method of claim 9, further comprising multiplying the spectral domain ramp response by $(j\omega)^{-2}$, where $j$ is an imaginary unit, and $\omega$ is a radial frequency.

11. The method of claim 10, further comprising:
applying an inverse Fourier transform to the spectral domain ramp response, thereby obtaining a time domain ramp response; and
calculating a surface area for the object as a function of depth.

12. The method of claim 11, wherein the applying the inverse Fourier transform and the calculating the surface area are for each polarization of the plurality of orthogonal linear polarizations.

13. The method of claim 1, wherein the transmitting the electromagnetic waves is carried out at a plurality of angles, the angles being between a range axis and a unit cross-product of two polarizations of the plurality of orthogonal linear polarizations scattered by the object.

14. The method of claim 2, further comprising detecting a bulk relative dielectric permittivity of the object by measuring higher order modes of the resonant electromagnetic waves.

15. The method of claim 14, wherein the detecting the bulk relative dielectric permittivity comprises calculating a simulated response by the object, and minimizing an error between the simulated response and the electromagnetic waves scattered by the object.

16. The method of claim 1, further comprising detecting a shape, location, dielectric permittivity, and dielectric conductivity of the body, based on the electromagnetic waves scattered by the object.

17. The method of claim 1, wherein the wavelength range corresponds to frequencies below 1 MHz.

18. A method comprising:
generating electromagnetic waves in a wavelength range, the electromagnetic waves having a plurality of orthogonal linear polarizations;
transmitting, by a transmitter, the electromagnetic waves to an object to be imaged; and
detecting, by a receiver and at each polarization of the plurality of orthogonal linear polarizations, electromagnetic waves scattered by the object,
wherein:
the object is located below ground,
the transmitter and the receiver are located above ground,
the wavelength range comprises wavelengths between 0.2 and 3 times a perimeter or lateral dimension of the object,
transmitting the electromagnetic waves comprises sweeping a wavelength over the wavelength range, and
the sweeping the wavelength is linear and based on a wavelength step size, a frequency step size corresponding to the wavelength step size being smaller than a speed of light divided by two times a depth of the object from ground level.

19. A method comprising:
generating electromagnetic waves in a wavelength range, the electromagnetic waves having a plurality of orthogonal linear polarizations;
transmitting, by a transmitter, the electromagnetic waves to an object to be imaged; and detecting, by a receiver and at each polarization of the plurality of orthogonal linear polarizations, electromagnetic waves scattered by the object, wherein:

the object is located below ground, the transmitter and the receiver are located above ground, and the wavelength range comprises wavelengths between 0.2 and 3 times a perimeter or lateral dimension of the object, the method further comprising:

applying a ramp filter in a frequency domain to obtain a spectral domain ramp response;

multiplying the spectral domain ramp response by $(j\omega)^{-2}$, where j is an imaginary unit, and $\omega$ is a radial frequency;

applying an inverse Fourier transform to the spectral domain ramp response, thereby obtaining a time domain ramp response; and calculating a surface area for the object as a function of depth.

20. The method of claim 19, wherein the applying the inverse Fourier transform and the calculating the surface area are for each polarization of the plurality of orthogonal linear polarizations.

* * * * *